US010859540B2

(12) United States Patent
Carlisle et al.

(10) Patent No.: US 10,859,540 B2
(45) Date of Patent: Dec. 8, 2020

(54) DUCKBILL SEPTUM

(71) Applicant: Chromatography Research Supplies, Inc., Louisville, KY (US)

(72) Inventors: Christopher A. Carlisle, Louisville, KY (US); Mohamed M. Marei, Louisville, KY (US); David L. Jones, Louisville, KY (US); Edward J. Heiny, Houston, TX (US); David S. Hubbard, Louisville, KY (US)

(73) Assignee: Chromatography Research Supplies, Inc., Louisville, KY (US)

( * ) Notice: Subject to any disclaimer, the term of this patent is extended or adjusted under 35 U.S.C. 154(b) by 0 days.

(21) Appl. No.: 16/195,548

(22) Filed: Nov. 19, 2018

(65) Prior Publication Data

US 2020/0041465 A1 Feb. 6, 2020

Related U.S. Application Data

(60) Provisional application No. 62/714,231, filed on Aug. 3, 2018.

(51) Int. Cl.
*G01N 30/18* (2006.01)
*G01N 30/02* (2006.01)
*F16K 15/18* (2006.01)

(52) U.S. Cl.
CPC ............ *G01N 30/18* (2013.01); *F16K 15/185* (2013.01); *G01N 2030/025* (2013.01)

(58) Field of Classification Search
CPC .............. G01N 30/18; G01N 2030/025; F16K 15/185; F16K 15/188

(Continued)

(56) References Cited

U.S. PATENT DOCUMENTS 1,051,554 A * 1/1913 Champion ........... B67D 1/0425
222/400.8
2,526,629 A * 10/1950 Bourke ................ B67D 1/0832
251/149.8

(Continued)

FOREIGN PATENT DOCUMENTS

| EP | 2004276 B1 | 7/2018 |
|---|---|---|
| WO | WO1995015194 | 8/1995 |
| WO | WO2005060844 A1 | 7/2005 |

OTHER PUBLICATIONS

International Search Report and Written Opinion, dated Apr. 18, 2019—International Application No. PCT/US2018/065997.

*Primary Examiner* — Timothy L Maust
*Assistant Examiner* — James R Hakomaki
(74) *Attorney, Agent, or Firm* — Dentons Bingham Greenebaum LLP; Brian W. Chellgren

(57) ABSTRACT

A septum containing a duckbill valve assembly includes a plurality of elastomeric ribs extending from the body of the septum to the duckbill valve assembly. When inserted into an injection port cavity, force generated by an interference fit between the body of the septum and the cavity is transmitted by the ribs to the duckbill valve assembly. The ribs are configured to reversibly collapse at a hinge point when a needle is inserted through the duckbill valve assembly and are spaced to assist in centering the needle in the duckbill valve assembly. The ribs reduce wear on the duckbill valve assembly by reducing the concentration of compressive forces at higher inlet pressures while maintaining sufficient compressive force to close the duckbill valve assembly at lower inlet pressures.

20 Claims, 21 Drawing Sheets

(58) Field of Classification Search
USPC .................................. 141/100; 137/511, 514
See application file for complete search history.

(56) References Cited

U.S. PATENT DOCUMENTS

| | | | | |
|---|---|---|---|---|
| 4,434,810 A * | 3/1984 | Atkinson | ............... | F16K 15/147 137/493 |
| 4,954,149 A | 4/1990 | Fullemann | | |
| 4,924,923 A * | 5/1990 | Boehmer | ............... | F16K 15/147 141/312 |
| 4,960,412 A * | 10/1990 | Fink | ................. | A61M 39/0606 604/167.04 |
| 5,010,925 A * | 4/1991 | Atkinson | ............... | F16K 15/147 137/846 |
| 5,269,763 A * | 12/1993 | Boehmer | .......... | A61M 39/0606 251/149.1 |
| 5,456,284 A * | 10/1995 | Ryan | ................. | A61B 1/00137 137/522 |
| 5,531,810 A | 7/1996 | Fullemann | | |
| 6,024,729 A * | 2/2000 | Dehdashtian | ..... | A61M 39/0606 604/167.04 |
| 6,258,065 B1 * | 7/2001 | Dennis | ............... | A61B 17/3462 604/167.01 |
| 6,702,255 B2 * | 3/2004 | Dehdashtian | ..... | A61M 39/0606 137/846 |
| 7,390,316 B2 * | 6/2008 | McFarlane | ......... | A61B 17/3462 604/167.03 |
| 7,470,261 B2 * | 12/2008 | Lynn | ..................... | A61M 39/02 604/167.03 |
| 8,016,791 B2 * | 9/2011 | Sugiki | .................. | F16K 15/147 604/167.04 |
| 8,096,976 B2 * | 1/2012 | Sugiki | ............... | A61M 39/0693 604/167.04 |
| 8,177,754 B2 * | 5/2012 | Barnes | ............... | A61B 17/3462 604/167.01 |
| 8,579,870 B2 * | 11/2013 | Willis | .................. | A61J 15/0092 604/246 |
| 9,522,266 B2 * | 12/2016 | Sutton | ................. | A61B 17/3462 |
| 10,391,292 B2 * | 8/2019 | Sutton | ............... | A61M 39/0613 |
| 10,502,332 B2 * | 12/2019 | Black | ..................... | G01N 30/18 |
| 2008/0066815 A1 * | 3/2008 | Anderson | ............ | F16K 15/147 137/846 |
| 2015/0148756 A1 | 5/2015 | Lynn | | |

* cited by examiner

DUCKBILL SEPTUM

CROSS-REFERENCE TO RELATED APPLICATION

This application claims the benefit of priority to U.S. provisional patent application Ser. No. 62/714,231, filed Aug. 3, 2018, for DUCKBILL SEPTUM, incorporated herein by reference.

FIELD OF THE INVENTION

A septum containing a duckbill valve assembly includes a plurality of elastomeric ribs extending from the body of the septum to the duckbill valve assembly. When inserted into an injection port cavity, force generated by an interference fit between the body of the septum and the cavity is transmitted by the ribs to the duckbill valve assembly. The ribs are configured to reversibly collapse at a hinge point when a needle is inserted through the duckbill valve assembly and are spaced to assist in centering the needle in the duckbill valve assembly. The ribs reduce wear on the duckbill valve assembly by reducing the concentration of compressive forces at higher inlet pressures while maintaining sufficient compressive force to close the duckbill valve assembly at lower inlet pressures.

BACKGROUND OF THE INVENTION

Gas chromatography ("GC") is a widely-used analytical technique with high sensitivity. Typically, liquid samples are injected through an elastomeric seal ("septum"), usually made from silicone rubber or other elastomers) into a hot injection port where the sample is vaporized in an inert gas stream, and components are separated as the stream is swept through a chromatographic column. Components eluting from the column are detected with highly-sensitive detectors. Inertness and reproducibility of injection are essential to maintain a high level of accuracy in detection.

The primary purpose of the septum is to seal against carrier gas leakage so the sample properly elutes through the chromatographic column. Ideally, the septum must serve as an effective, gas-tight seal for up to hundreds of injections, each requiring a needle to pierce through the thickness of the septum. The septum may be exposed to temperatures ranging from ambient temperature to nearly 300° C., and to gas pressures up to nearly 100 psi. Temperatures and pressures experienced by the portion of the septum inserted into the injection port may be referred to as inlet temperatures and inlet pressures respectively.

GC septa currently used in laboratories largely meet the requirement to seal reliably, and typically follow a single basic design: a solid disk or plug of elastomeric material through which the needle is pierced to inject samples. While this basic design does function effectively as a seal, one problem that has not been solved so far is the unintentional introduction of contaminating particles into the GC inlet. Repeated passage of a needle through a septum abrades the septum and roughens the needle, leading to particulate septum material and metal fines from the needle being brushed into the inlet. The septum material adds volatile contamination to the chromatographic baseline, which can appear as peaks that interfere with desired peaks from the sample components, and both the septum material and metal fines potentially act as adsorbents or catalysts, removing or degrading components in the inlet before they can be detected.

At least one mechanical seal is available on the market that significantly reduces particle generation by replacing the solid elastomeric disk with a molded duckbill valve assembly (U.S. Pat. Nos. 4,954,149 and 5,531,810). For each injection, the duckbill valve assembly is opened as a blunt or "bullet nose" needle is extended through the assembly. Upon removal of the needle, the assembly closes by a combination of (1) relaxation of the rubber duckbill valve assembly deformed by the presence of the needle, (2) gas pressure exerted on the valve assembly inside the GC inlet, and (3) a metal spring (in U.S. Pat. No. 4,954,149) or clip (in U.S. Pat. No. 5,531,810) affixed to the duckbill valve assembly biased to force the assembly closed. The first mechanism for closing the assembly is dependent upon the inherent resilience of rubber. This resilience decreases over time as rubber hardens upon prolonged exposure to elevated temperatures inside the GC inlet. The second mechanism for closure may not be sufficient for adequate closure, particularly when the mechanical seal is used at lower pressures. Softer rubbers are more susceptible to relaxation and are more responsive to gas pressure, but are also more sensitive to abrasion and hardening. Harder rubbers are more resilient to abrasion, but are less susceptible to relaxing and less responsive to gas pressure. As such, these references rely upon the mechanical spring or clip to reliably close the duckbill valve assembly after the needle is withdrawn. However, the mechanical spring and clip must be manufactured to precise tolerances and properly attached to the septum, as an overly rigid spring or overly tight clip may increase wear on the septum and an overly pliable or improperly attached spring or clip may not provide adequate sealing and allow leaks. Furthermore, the mechanical spring and clip are relatively costly components in the prior art mechanical seal and also adds complexity to the product.

An alternative approach contemplated in U.S. Pat. No. 4,954,149 replaces the metal spring with a pair of opposing radial ribs to close the duckbill. Said ribs consist of solid material contiguous with the outer rim of the septum and arranged perpendicular to the duckbill aperture. This arrangement increases the abrasion forces on the elastomeric material, with the only mode of stress relief being compression of the rubber in a direction normal to the slit. In this way, the effect of the ribs is similar to using a solid plug of material as both designs restrict the duckbill lips from deforming in a direction normal to the slit upon insertion of a needle.

SUMMARY

It is the object of the present invention to reduce contamination in the GC inlet and provide improved sealing at low pressure by providing a novel duckbill septum. This duckbill septum includes a plurality of elastomeric ribs extending from the body of the septum to the duckbill valve assembly. When inserted into an injection port cavity, force generated by an interference fit between the body of the septum and the cavity is transmitted by the ribs to the duckbill valve assembly, providing a sealing force.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1A:
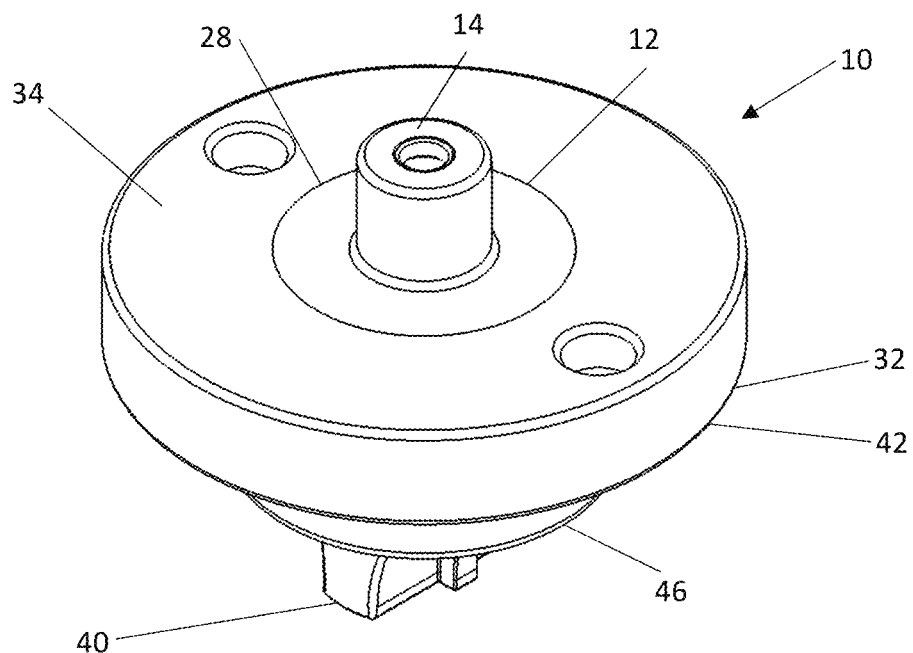
FIG. 1A depicts a top perspective view of a first embodiment of a duckbill septum.
Figure 1B:
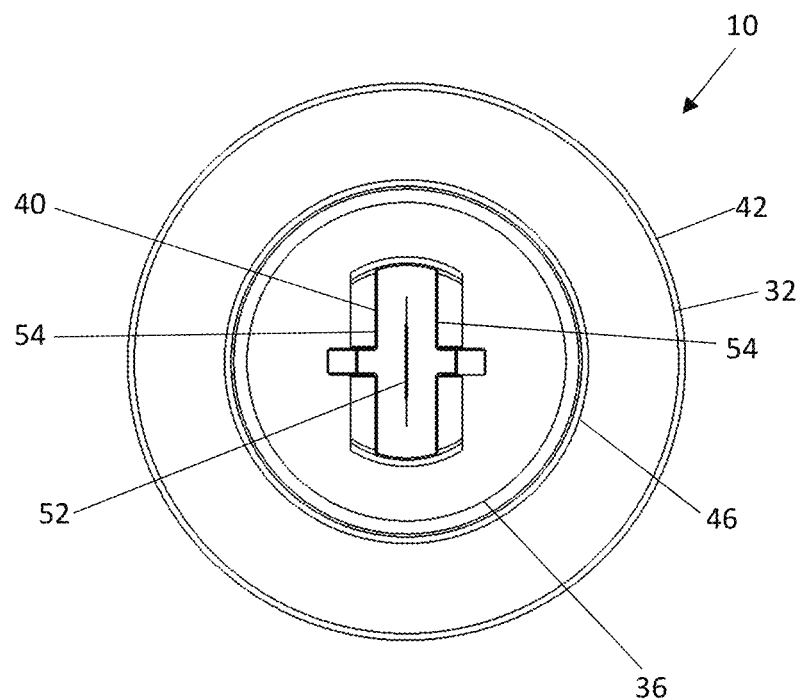
FIG. 1B depicts a bottom view of the septum of FIG. 1A.
Figure 1C:
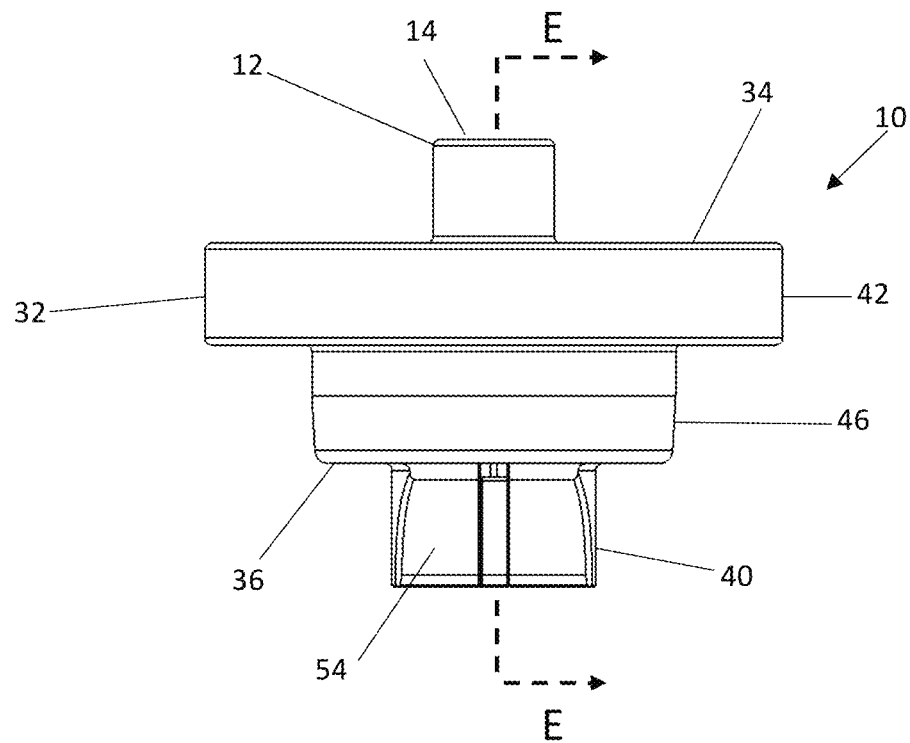
FIG. 1C depicts a side view of the septum of FIG. 1A, the opposite side being identical thereto.
Figure 1D:
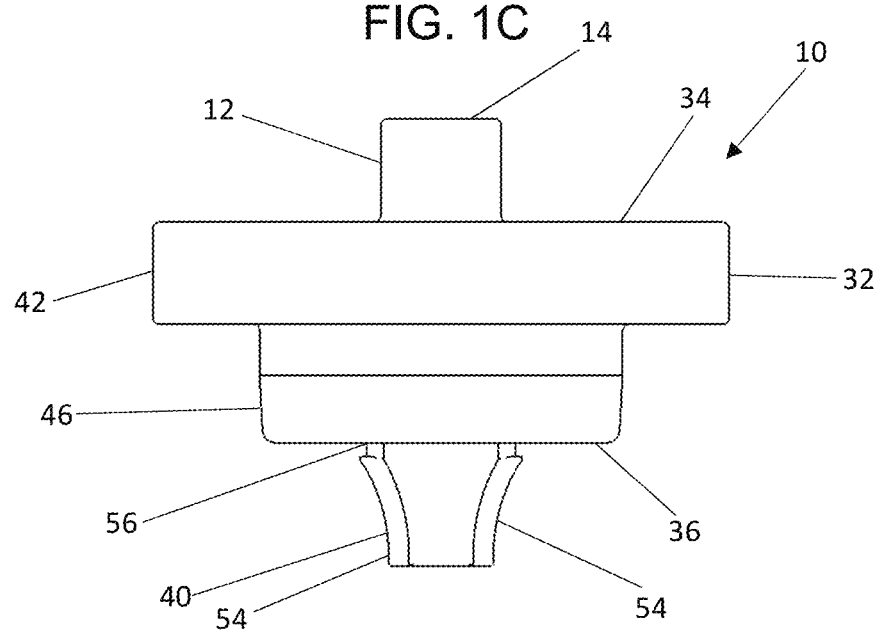
FIG. 1D depicts an end view of the septum of FIG. 1A, the opposite end being identical thereto.
Figure 1E:
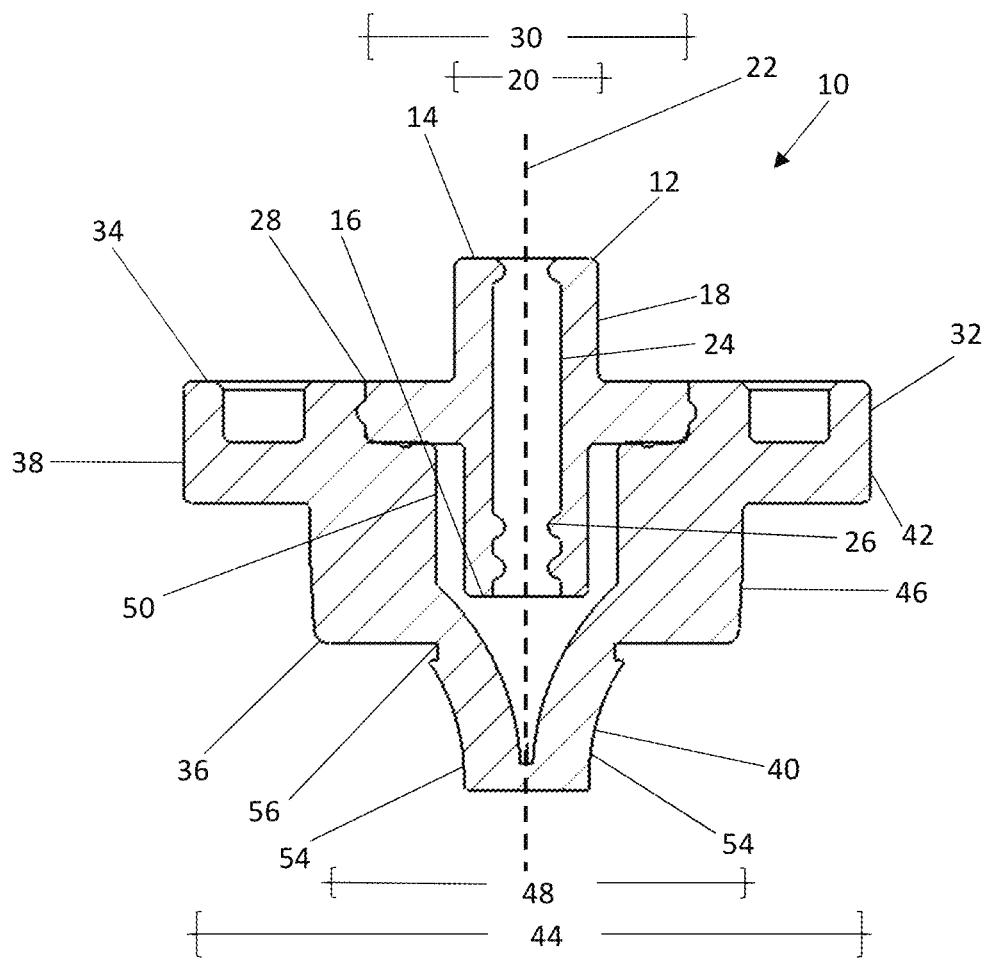
FIG. 1E depicts a cross-sectional view of the septum of FIG. 1A along line E-E of FIG. 1C.

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments of the present invention, other embodiments may not include those same advantages, or may include different advantages. Any advantages described herein are not to be construed as limiting to any of the claims.

Specific quantities (spatial dimensions, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated. The terms "top" and "bottom" are used herein refer to the orientation of septa shown in the drawings and to the movement of a needle, which is inserted into the top of a septum, passes through the septum, and emerges from the bottom. It should be understood that a septum may be mounted on a fitting at various orientations, such that the insertion point "top" may be oriented sideways, at an angle, or upside down.

Referring to FIGS. 1A-1E, a first embodiment of a duckbill septum 10 is formed in two parts for ease of manufacture. The first portion 12 has axial symmetry and is generally cylindrical in shape, having a top end 14, a bottom end 16, a side 18 extending between the top end 14 and the bottom end 16, a first diameter 20, and an axis 22 extending substantially perpendicular to the first diameter 20. A central bore 24 extends along the axis 22. The first portion 12 further includes a flange 28 extending from the side 18, the flange 28 having a second diameter 30 greater than the first diameter 20. In some embodiments, the central bore 24 includes at least one constriction 26, also referred to as a "wiper" along the length of the bore 24. These constrictions 26 serve as seals when a needle is inserted through the bore 24 and mechanically prevent dust from passing through the bore 24, wiping the dust from the needle as it sequentially passes each constriction 26.

The second portion 32 of the duckbill septum 10 has bilateral symmetry and is generally cylindrical in shape having a top end 34, a bottom end 36, a side 38 extending between the top end 34 and the bottom end 36, and a duckbill valve assembly 40 extending downward from the bottom end 36. An upper portion 42 of the second portion 32 has a first diameter 44 and a lower portion 46 of the second portion 32 has a second diameter 48, the first diameter 44 being greater than the second diameter 48. The axis 22 extends through the second portion 32 substantially perpendicular to first and second diameters 44, 48. The second portion 32 includes a recess 50 sized and shaped to receive the flange 28 and bottom end 16 of the first portion 12. A friction fit between the flange 28 and the recess 50 maintains the first portion 12 partially within the second portion 32. The duckbill valve assembly 40 includes a slit 52, such that a needle may extend into the top end 14 of the first portion 12, through the central bore 24, into the recess 50, and through the duckbill valve assembly 40, emerging from the slit 52. The duckbill valve assembly 40 further includes a pair of opposing sides 54 and an encircling notch 56.

Without a mechanical spring or other mechanism to assist closure of the duckbill valve assembly 40, the first embodiment of a duckbill septum 10 was found to have undesirable leakage. As indicated in Table 1, the duckbill septum 10 immediately leaked when exposed to only 1 psi pressure, leaked after approximately 300 injections when exposed to 5 psi pressure, and leaked initially and/or after 40 injections when exposed to 3 psi pressure (the test was run in duplicate at 3 psi). A septum should preferably serve for at least one thousand injections before significant leakage occurs.

TABLE 1

Leak Rates of First Embodiment Duckbill Septum - Conditions: 1 psi - 5 psi, inlet 275° C., nut tightened ¼ turn past first contact, 23-gauge cone-tip needle, injecting methanol. The leak rate is measured using both a flow meter which provides a leak rate in units of milliliters per minute, and an electronic leak detector which displays from 0 to a maximum of 7 lights as the leak rate increases.

| # of Injections | mL/min | Lights |
|---|---|---|
| 1 Psi Internal Pressure | | |
| Init. | 0.01 | 5 |
| 20 | 5.37 | 7 |
| 40 | 5.25 | 7 |
| — | — | — |
| — | — | — |
| 3 Psi Internal Pressure | | |
| Init. | 0.01 | 4 |
| 20 | 0.04 | 7 |
| 40 | 0.09 | 7 |
| — | — | — |
| — | — | — |
| 3 Psi Internal Pressure | | |
| Init. | 0 | 1 |
| 20 | 0 | 3 |
| 40 | 0.02 | 5 |
| 60 | 0.04 | 6 |
| — | — | — |
| 5 Psi Internal Pressure | | |
| Init. | 0 | 2 |
| 20 | 0 | 1 |
| 40 | 0 | 1 |
| 100 | 0 | 2 |
| 200 | 0 | 2 |
| 300 | 0.52 | 7 |

Figure 2A:
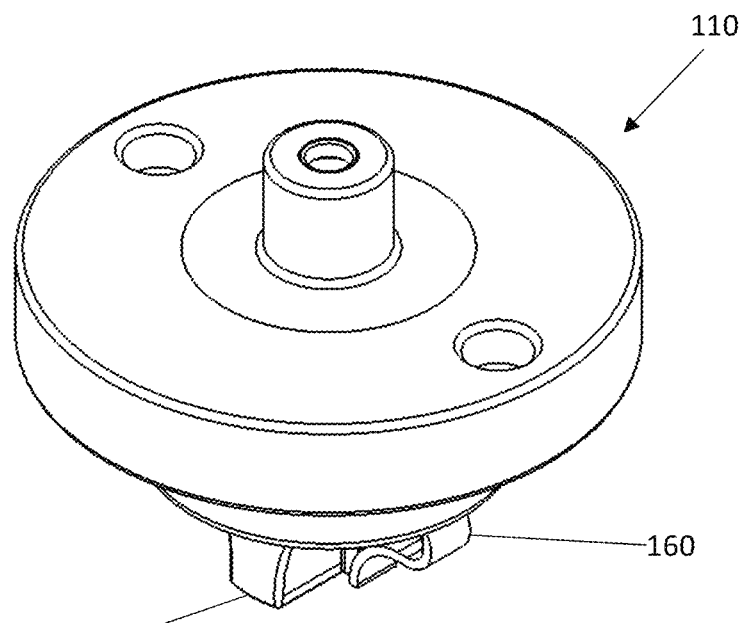
FIG. 2A depicts a top perspective view of a second embodiment of a duckbill septum.
Figure 2B:
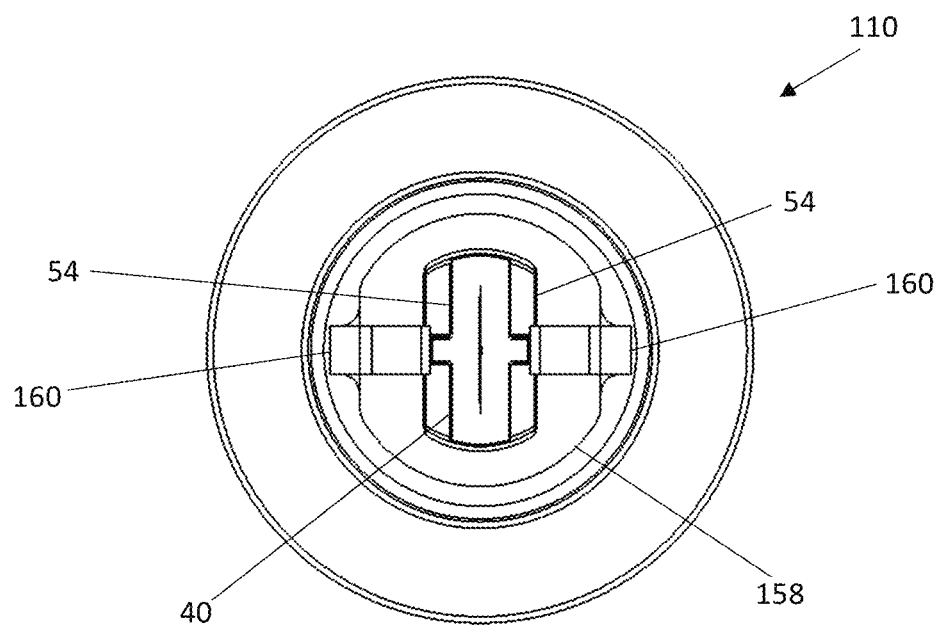
FIG. 2B depicts a bottom view of the septum of FIG. 2A.
Figure 2C:
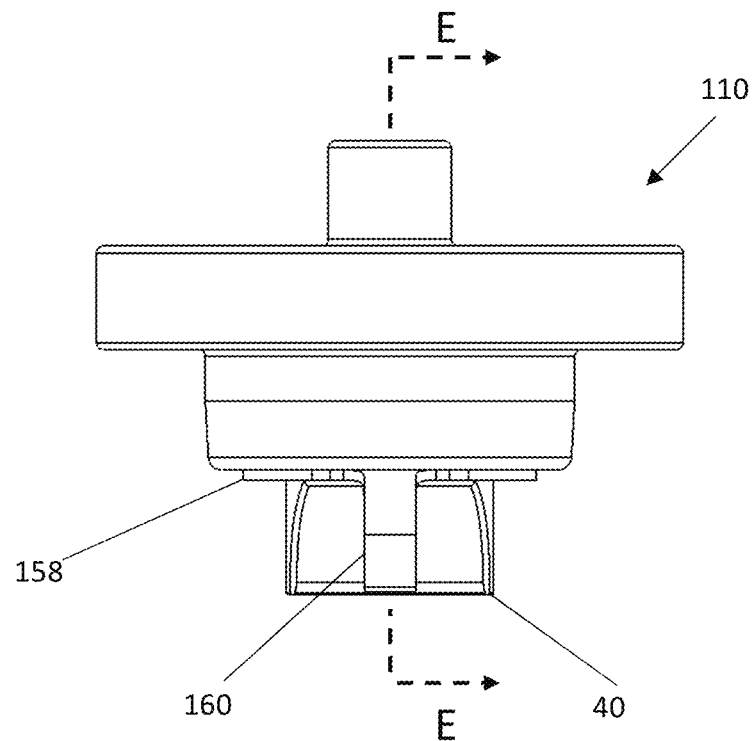
FIG. 2C depicts a side view of the septum of FIG. 2A, the opposite side being identical thereto.
Figure 2D:
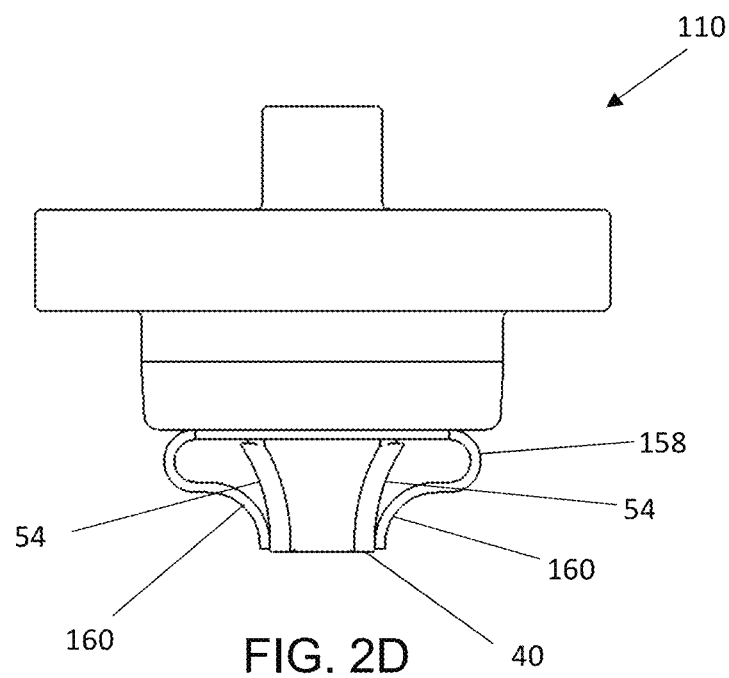
FIG. 2D depicts an end view of the septum of FIG. 2A, the opposite side being identical thereto
Figure 2E:
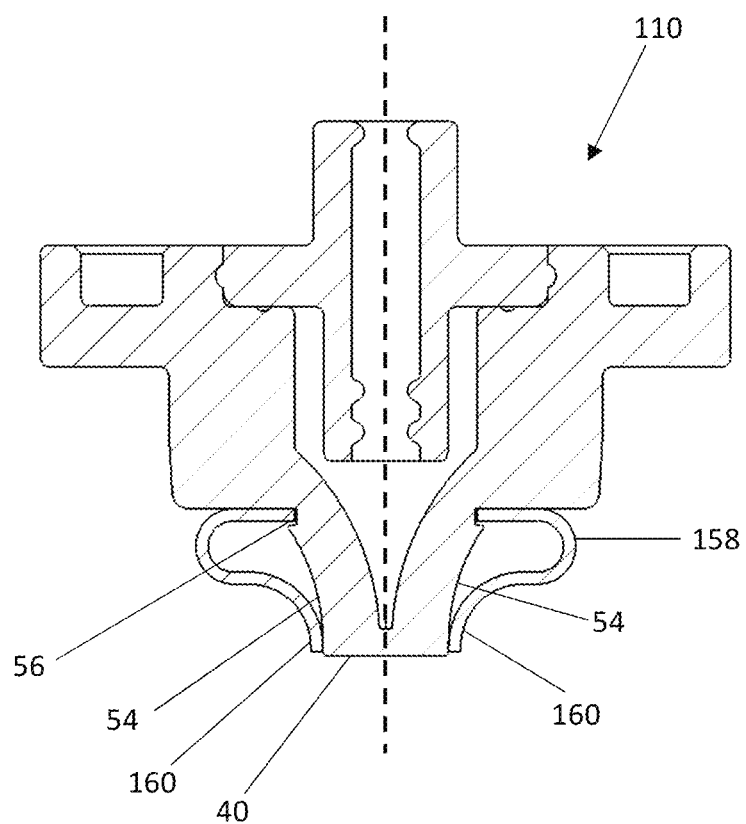
FIG. 2E depicts a cross-sectional view of the septum along line E-E of FIG. 2C.
Figure 2F:
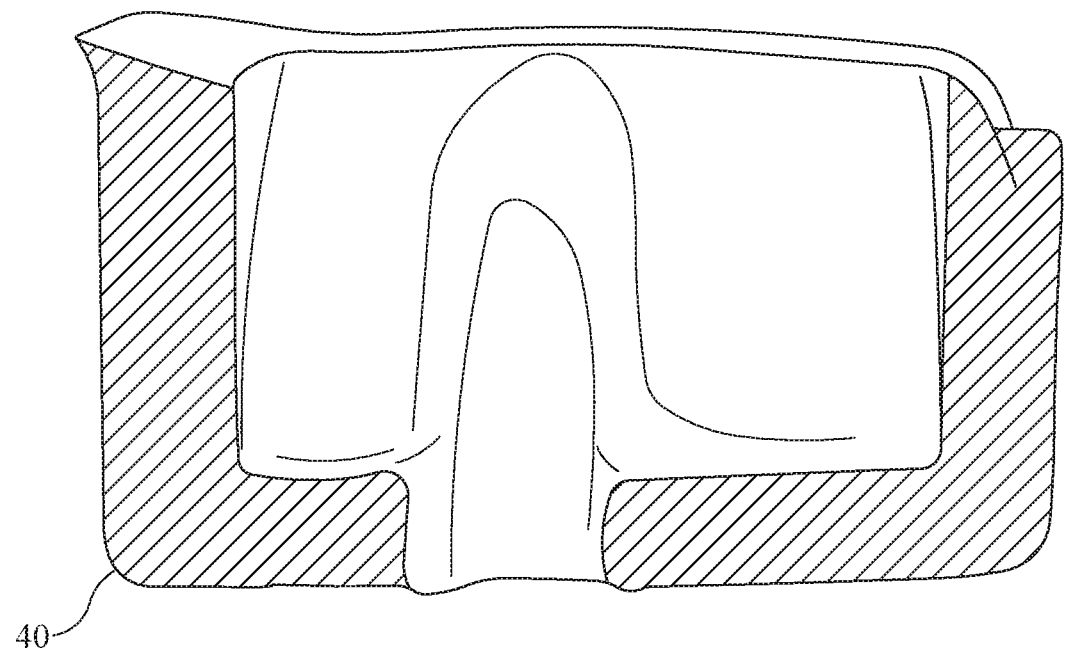
FIG. 2F is a photograph displaying an interior face of the duckbill valve assembly of the second embodiment septum after multiple injections.
Figure 2G:
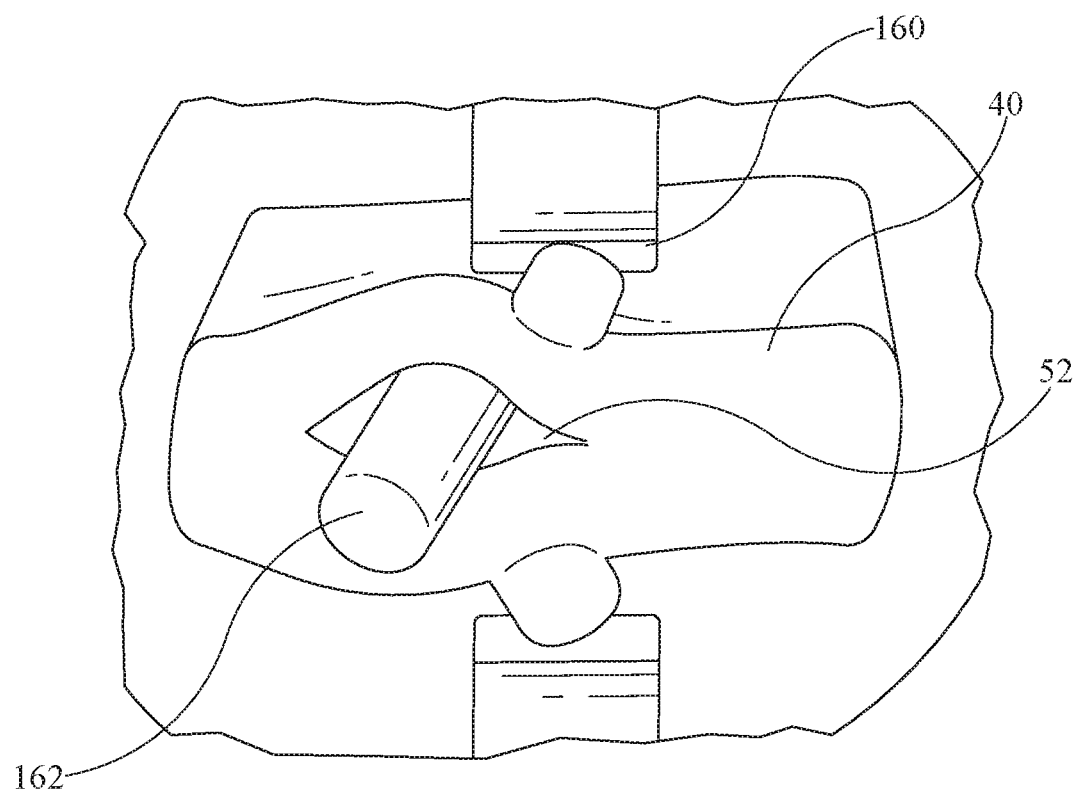
FIG. 2G is a photograph displaying a bottom view of the second embodiment septum with a needle extending through the valve assembly.

Referring to FIGS. 2A-2E, a second embodiment of a duckbill septum 110 is identical to the first embodiment 10, but further includes a mechanical spring 158. The spring 158 is located partially within the notch 56, encircling the duckbill valve assembly and includes a pair of arms 160 which contact opposite sides 54 of the duckbill valve assembly 40, exerting a force biasing the duckbill valve assembly 40 closed. The spring 158 preferably exerts substantially equal and opposite forces on either side of the duckbill valve assembly 40 to maintain a needle in the center of the valve assembly 40. The spring 158 is preferably designed to exert sufficient force to reliably close the valve assembly 40 when the needle is absent, but excess force increases the abrasion of the rubber duckbill valve assembly 40 as the needle is inserted and withdrawn. FIG. 2F depicts the interior of a duckbill valve assembly 40 from this second embodiment, and the abrasion resulting from repeated injections through a spring with an excessive closing force. Material abraded from the valve assembly may result in particulate contaminants in the GC and/or may prevent proper sealing of the duckbill valve assembly, resulting in leakage. FIG. 2G depicts a needle 162 emerging off-center from the slit of a duckbill septum 110 of the second embodiment due to a spring 158 providing a non-symmetric closing force. In addition to these issues, missteps in installation of the spring 158 may result in accelerated abrasion of the septum 110 or mechanical failure of the spring 158.

Referring to FIGS. 3A-3E, a third embodiment of a duckbill septum 210 is formed in two parts for ease of manufacture. The first portion 12 in this third embodiment is substantially identical to the first portions 12 in the first and second embodiments 10, 110. Like the other designs, this first portion 12 has axial symmetry and is generally cylindrical in shape, having a top end 14, a bottom end 16, a side 18 extending between the top end 14 and the bottom end 16, and a first diameter 20, and an axis 222 extending substantially perpendicular to the first diameter 20 between the top end 14 and the bottom end 16. A central bore 24 extends along the axis 222. In some embodiments, the central bore 24 includes at least one constriction 26 along the length of the bore 24. The first portion 12 further includes a flange 28 extending from the side 18, the flange 28 having a second diameter 30 greater than the first diameter 20.

The second portion 232 of the duckbill septum 210 has bilateral symmetry and is generally cylindrical in shape, having a top end 234, a bottom end 236, a side 238 extending between the top end 234 and the bottom end 236. An upper portion 242 of the second portion 232 has a first diameter 244 and a lower portion 246 of the second portion 232 has a second diameter 248, the first diameter 244 being greater than the second diameter 248. In some embodiments, the second diameter 248 is approximately 5.38 mm, which results in an interference fit of approximately 0.075 mm when inserted into a standard sized GC injection port. In some embodiments, the first diameter 244 of the upper portion 242 is approximately 8.50 mm. In certain embodiments, the upper portion 242 has a height of approximately 1.5 mm and the lower portion 246 has a height of approximately 3.94 mm. In other embodiments, the interference fit between the septum 210 and GC injection port may be enacted by other means, such as an internal jacket, a radial force created by vertical compression of the septum 210 in the GC injection port, or other means or mechanism known in the art.

The axis extends through the second portion 232 substantially perpendicular to the first diameter 244 and second diameter 248. The top end 234 of the second portion 232 includes a recess 250 sized and shaped to receive the flange 28 and bottom end 16 of the first portion 12. A friction fit between the flange 28 and the recess 250 maintains the first portion 12 partially within the second portion 232. In other embodiments, the first portion 12 and second portion 232 may engage via an adhesive, chemical bonding, or other means known in the art. When engaged, the first portion 12 and second portion 232 are collectively referred to as the body of the septum.

The bottom end 236 of the second portion 232 includes a cavity 264 defined by the generally cylindrical lower portion 246. A duckbill valve assembly 240 is located within the cavity 264. As shown in FIGS. 3C, 3D, and 3E, the duckbill valve assembly 240 is recessed approximately 0.28 mm from the bottom end 236 to avoid contact between the duckbill valve assembly 240 and the GC inlet. The duckbill valve assembly 240 includes a slit 252, such that a needle may extend into the top end 14 of the first portion 12, through the central bore 24, out the bottom end 16 of the first portion 12, into the recess 250, and through the duckbill valve assembly 240, emerging from the slit 252. A plurality of ribs 266 extend from the duckbill valve assembly 240 to the interior wall 268 of the cavity 264. In the depicted embodiment, two ribs 266 extend from each side 254 of the duckbill valve assembly 240, each being spaced apart on either side of the axis 222.

When in use, at least the lower portion 246 of the septum 210 is positioned within a GC injection port cavity. A predetermined interference fit between the septum 210 and injection port cavity generates compression force, which is transferred from the side 238, through the ribs 266, to opposite sides 254 of the duckbill valve assembly 240. In some embodiments, a pressure on the internal sealing surface 270 of the duckbill valve assembly 240 of greater than about 0.5 MPa provides an adequate seal, but a pressure of greater than about 2.5 MPa tends to increase the abrasion of the duckbill valve assembly 240 upon repeated injection. In other embodiments, using harder or softer elastomeric material in the septum 210, higher or lower pressures may suffice to provide an adequate seal or may cause increased abrasion. Modification of the geometry of the ribs 266 can also be modified to enhance sealing at low pressures or minimize abrasion during needle insertion and retraction, particularly at higher pressures.

Figure 3A:
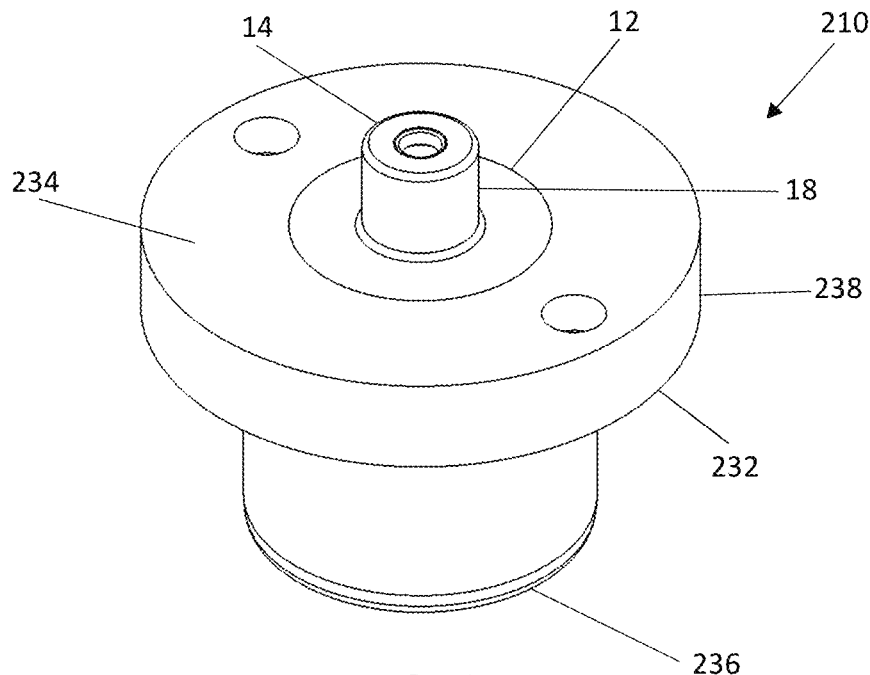
FIG. 3A depicts a top perspective view of a third embodiment of a duckbill septum.
Figure 3B:
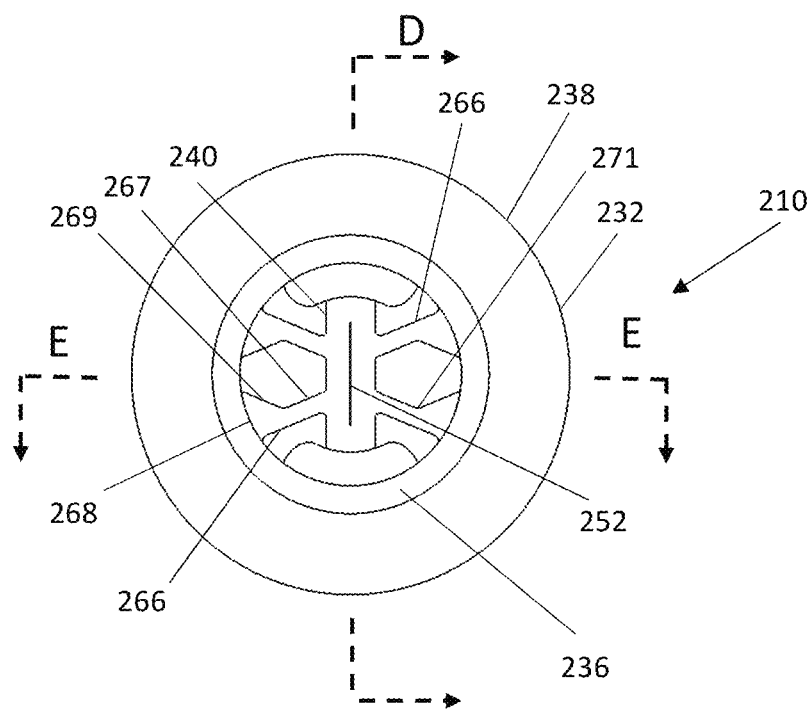
FIG. 3B depicts a bottom view of the septum of FIG. 3A.
Figure 3C:
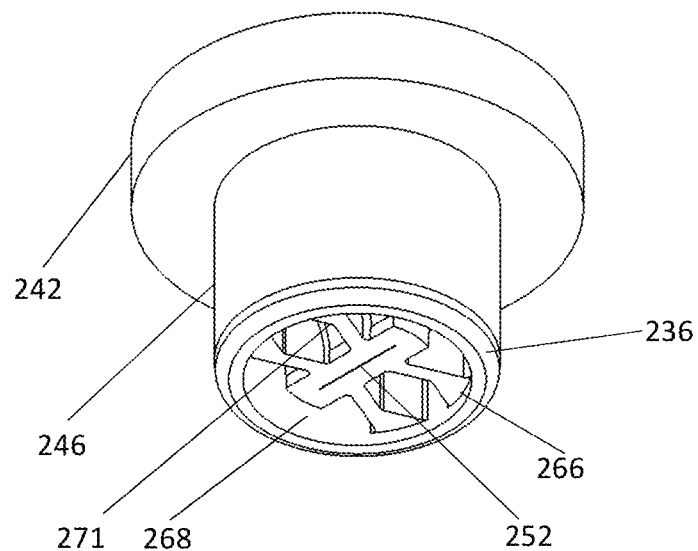
FIG. 3C depicts a bottom perspective view of the septum of FIG. 3A.
Figure 3D:
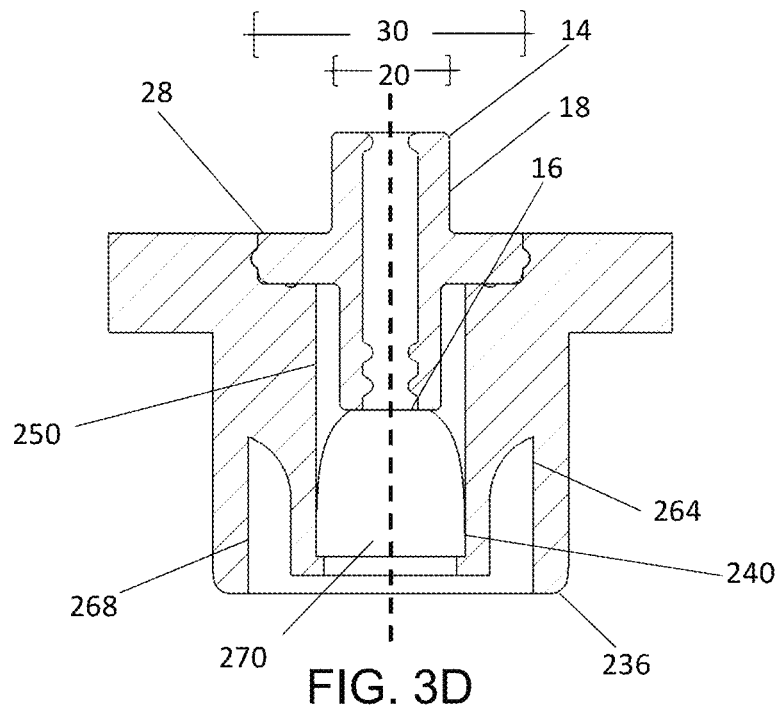
FIG. 3D depicts a cross-sectional view of the septum along line D-D of FIG. 3C
Figure 3E:
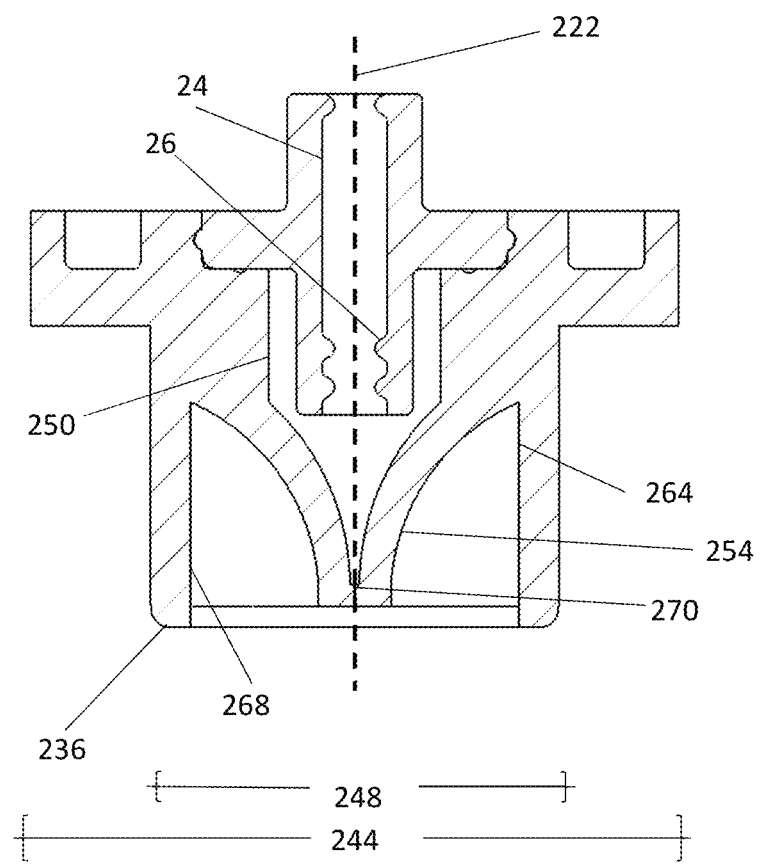
FIG. 3E depicts a cross-sectional view of the septum along line E-E of FIG. 3C.

As most easily seen in FIGS. 3B and 3C, the geometry of the ribs 266 enable the duckbill valve assembly 240 to utilize multiple modes of relaxation during translocation of the needle, specifically, compression, bending, and stretching. Compression along the axis of each rib occurs when the needle is inserted thereby relieving some stress that would otherwise lead to undesirable abrasion. Furthermore, each rib 266 includes a relatively thin portion 267 affixed to the duckbill valve assembly 240 and a relatively thick portion 269 affixed to the interior wall 268, the thin portion 267 and thick portion 269 being arranged at a non-parallel angle, thereby forming a geometric hinge point 271 along the length of the rib 266. In some embodiments, the thin portion 267 has a width of about 0.375 mm and the thick portion 269 has a width increasing from about 0.375 mm at its contact with the thin portion 267 to about 0.98 mm at its contact with the interior wall 268. Upon insertion of a needle through the duckbill valve assembly 240, the thin portion 267 may deflect such that the rib bends around the hinge point 271. Together, these features allow the rib 266 to deflect thereby accommodating the needle as it is inserted through the duckbill valve assembly 240. Lastly, a stretching relaxation is accessible along each side 254 of the duckbill valve assembly 240 because the material can deflect in a direction perpendicular to the slit 252 into space into space available between the ribs 266 to accommodate the circumference of the needle. For this reason, the septum 210 includes two ribs 266 spaced apart on either side 254 of the duckbill valve assembly 240. In other embodiments, the septum 210 may include additional or fewer ribs on each side 254, or may utilize curved ribs capable of bending.

The elastomer ribs 266 can also decrease the effects of abrasion at the higher operating pressure because the ribs reduce the effective duckbill surface area exposed to pressure inside the GC inlet. The range at which the effects of reduced abrasion are noticeable are between about 3 psi to about 100 psi operating pressure. Furthermore, the angle of the ribs 266 to the needle allows for additional area of contact between the sealing surfaces 270 and the needle, thus reducing the compressive force concentration from two points to four points. The reduction of the compressive forces on the duckbill valve assembly 240 at higher pressures thereby leads to reduced abrasion on the sealing surfaces 270. Also, the angle of the ribs 266 to the needle provides additional centering since the needle is supported by four points instead of only two as in previous designs. In the depicted embodiment, the thin portion 267 of each rib 266 is oriented at an angle of approximately 67.5 degrees with respect to the slit 252. In other embodiments, the angle may be non-perpendicular to the slit (i.e., not 90 degrees), between 5 degrees and 85 degrees, or between 30 degrees and 75 degrees, depending on the desired characteristics of the septum 210. For example, higher degree angles may more effectively transfer compression force to the duckbill valve assembly and be more suited for use in septa intended for GC with lower operating pressure, and lower degree angles may be more suited for use in septa intended for GC with higher operating pressure.

Figure 4:
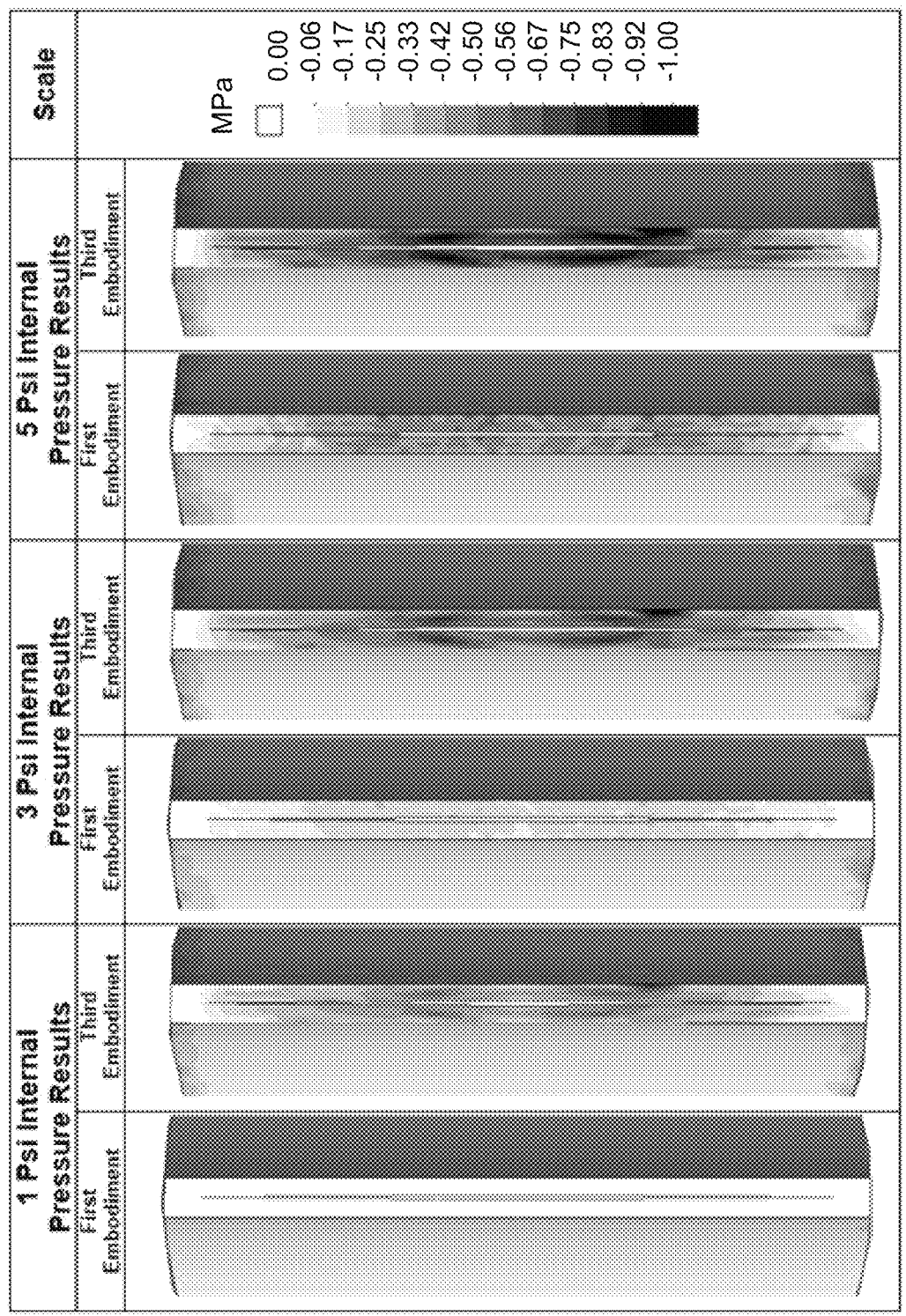
FIG. 4 is a plot of compressive stress (N/mm$^2$ or MPa) experienced by the first embodiment septum and third embodiment septum in pressure environments of 1 psi, 3 psi, and 5 psi.

Experimental evidence has shown that the third embodiment of the duckbill septum exhibits improved performance in closure of the duckbill valve assembly over the first embodiment (which lacks a spring or ribs to facilitate closure). Referring now to FIG. 4, finite element analysis was used to verify the effectiveness of the interference fit concept for sealing at low pressures. The analysis shows a top view of the duckbill sealing lips depicting compressive stress in the direction of the sealing surface comparing the first embodiment and the third embodiment of the duckbill septum. Without being bound by theory, it is postulated that the higher the compressive stress acting on the sealing surface, the better the sealing performance should be at low operating pressures. In these results, white indicates substantially no compressive stress and darker colors indicate higher amounts of compressive stress. Results show that the third embodiment duckbill septum offers compressive stress of the duckbill lips at 1 psi that is greater than the compressive stress achieved for the first embodiment duckbill septum 10 at 5 psi.

Figure 5:
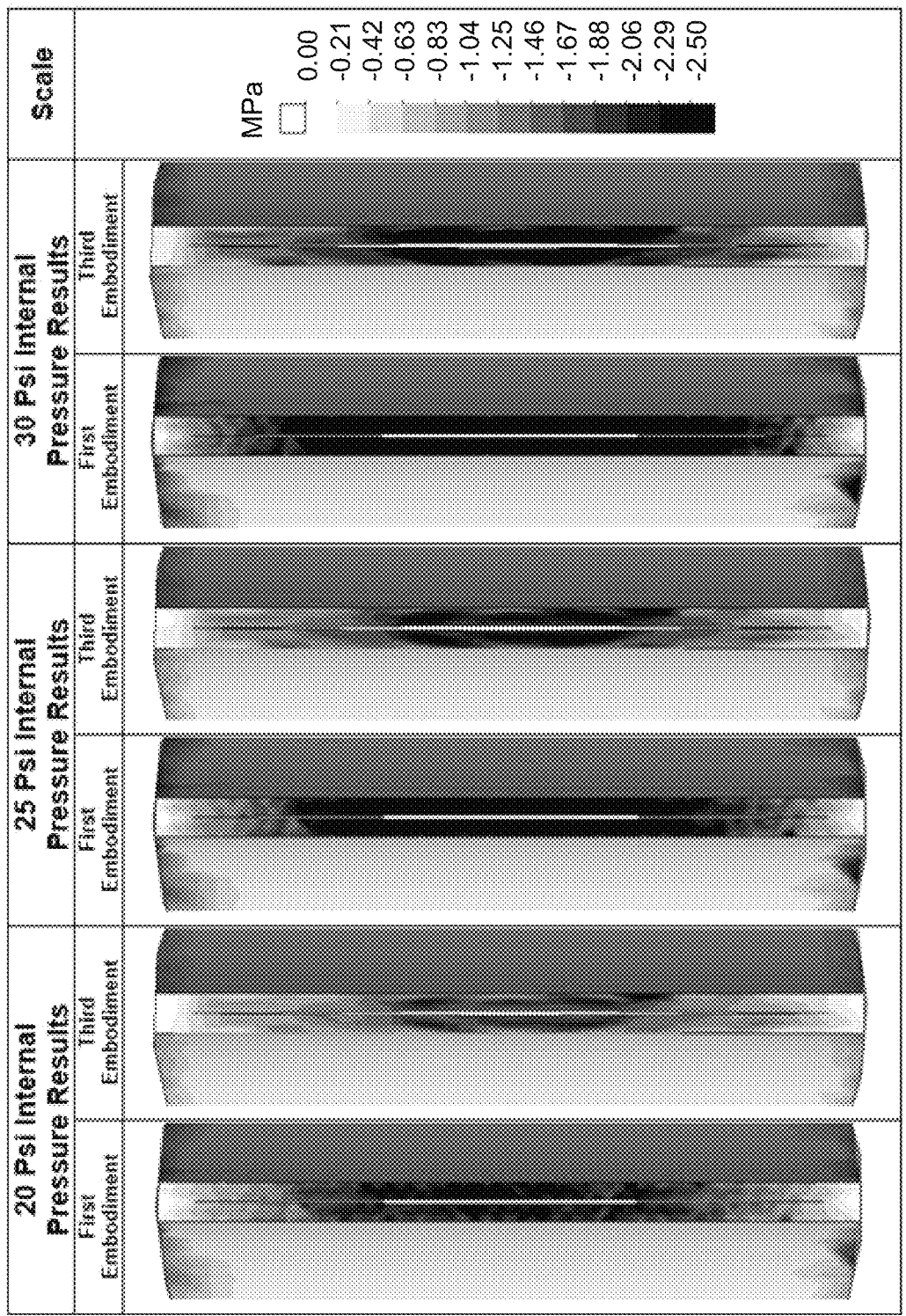
FIG. 5 is a plot of compressive force (N/mm$^2$ or MPa) experienced by the first embodiment septum and third embodiment septum in pressure environments of 20 psi, 25 psi, and 30 psi.

Referring now to FIG. 5, finite element analysis shows the reduction of compressive stress in the direction of the sealing surface for the third embodiment of the duckbill septum as compared to the first embodiment. The analysis shows a top view of the duckbill sealing lips depicting compressive stress in the direction of the sealing surface comparing the first embodiment and the third embodiment of the duckbill septum. In these results, white indicates substantially no compressive stress and darker colors indicate higher amounts of compressive stress. Results show that the third embodiment of the duckbill septum is calculated to offer similar compressive stress at 30 psi to the first embodiment of the duckbill septum at 20 psi. At these higher pressures, a lower compressive stress is preferable to reduce abrasion.

Figure 6A:
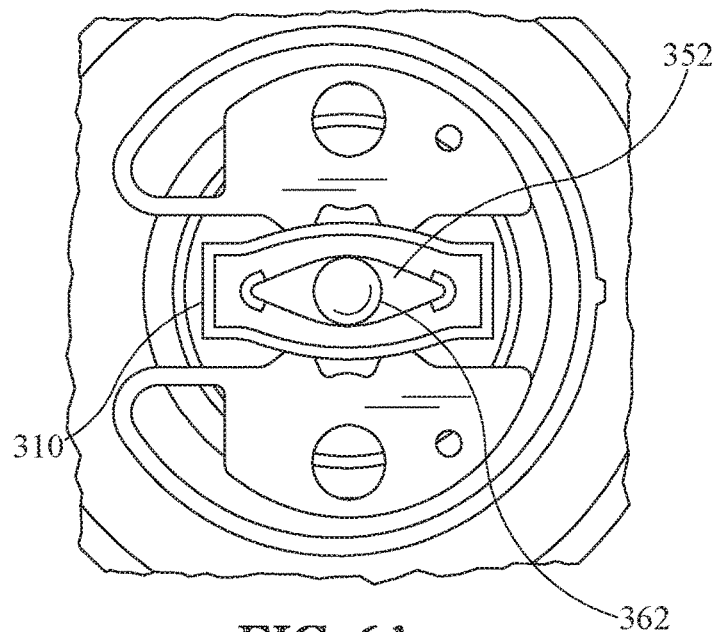
FIG. 6A depicts bottom view of a needle extending through a third-party duckbill septum.
Figure 6B:
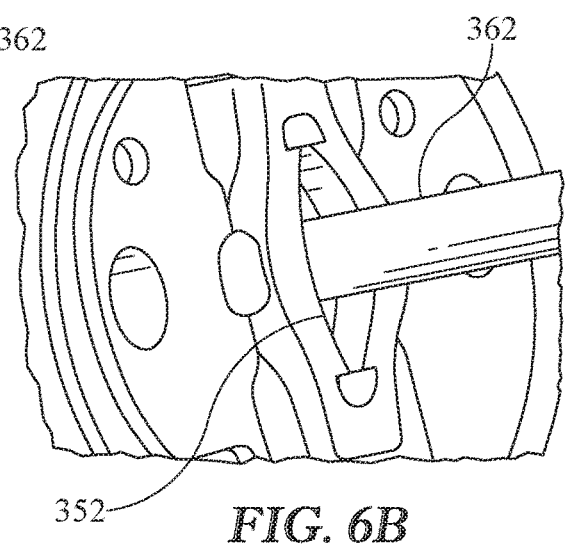
FIG. 6B depicts a bottom, side perspective view of the third-party septum in FIG. 6A.
Figure 6C:
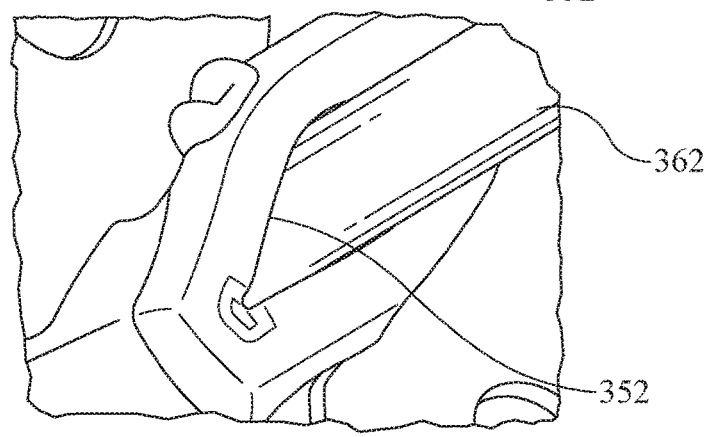
FIG. 6C depicts a bottom, end perspective view of the third-party septum in FIG. 6A.
Figure 7:
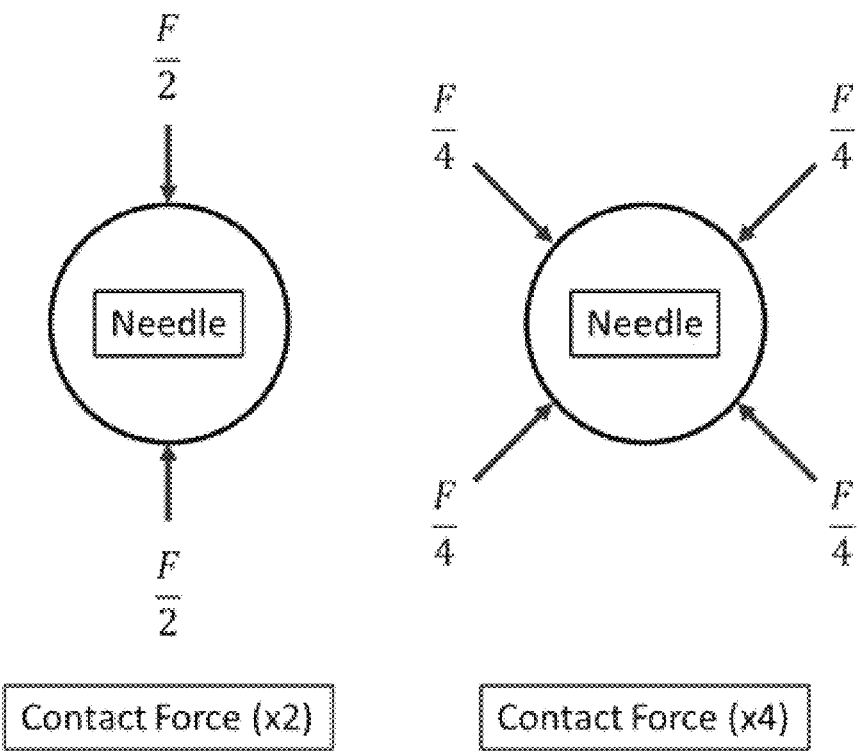
FIG. 7 is a schematic diagram of the contact force applied to a needle extending through the first embodiment duckbill septum, second embodiment duckbill septum, and third-party duckbill septum (left panel) and the third embodiment duckbill septum (right panel).

A duckbill valve assembly deforms around a needle as the needle is inserted through the assembly. FIGS. 6A, 6B, and 6C display a third-party duckbill septum 310 deforming around a needle 362 to produce a convex "diamond" shape. This deformation is based around two contact points between the needle 362 and septum 310 on opposite sides of the slit 352. This arrangement of forces is shown schematically in FIG. 7, left panel. In comparison, as shown in the right panel of FIG. 7, the third embodiment of a duckbill septum deforms around four contact points corresponding to the locations of the ribs.

Figure 8:
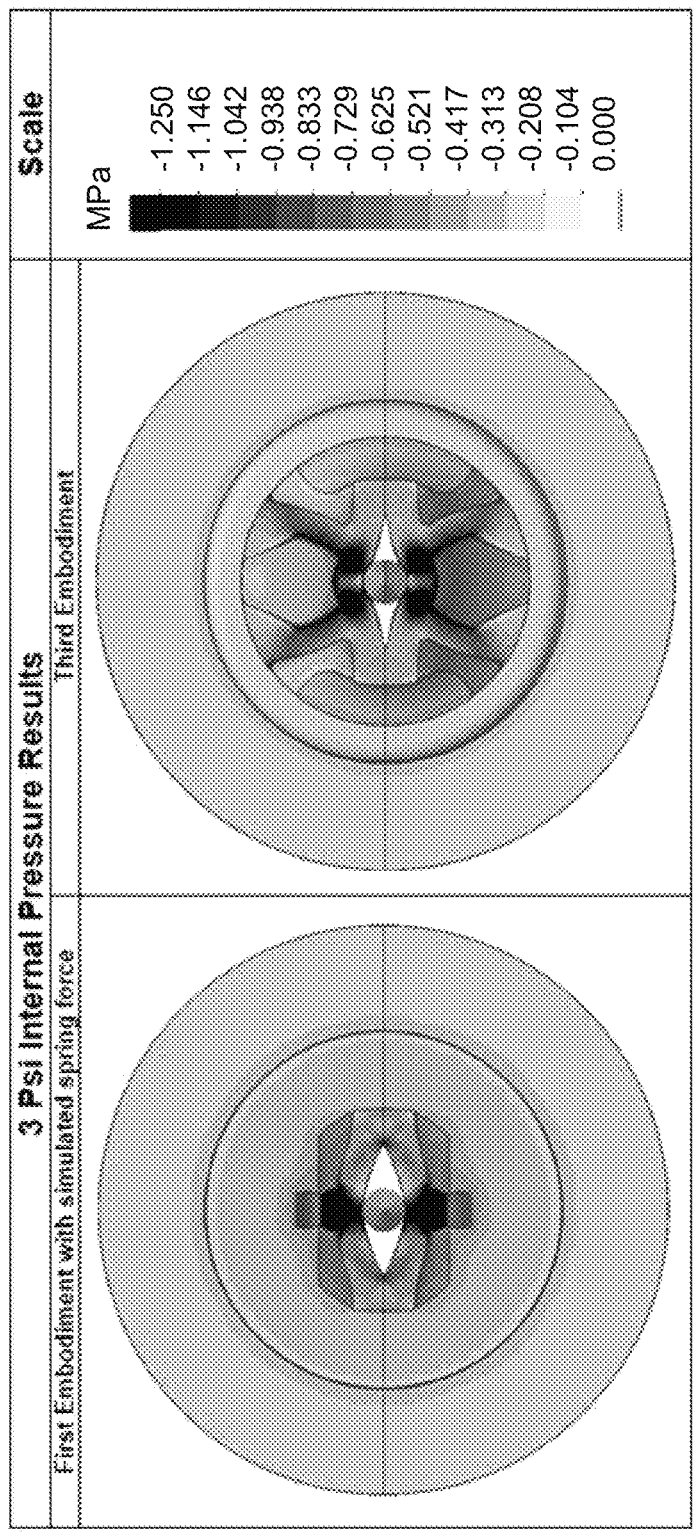
FIG. 8 is a plot of von Mises stress experienced by the first embodiment septum with simulated spring force (simulating the second embodiment duckbill septum) (left panel) and third embodiment septum (right panel) upon needle insertion.

Finite element analysis shows the reduction of von Mises stress for the first embodiment duckbill septum with an assumed spring force of 0.15 N applied (simulating the effect of a spring, as in the second embodiment duckbill septum), as compared to the third embodiment duckbill septum, with a needle inserted into each septum. FIG. 8 shows a bottom view of the respective septa depicting von Mises stress. In these results, white indicates substantially no von Mises stress and darker colors indicate higher amounts of von Mises stress. As indicated, the third embodiment duckbill septum not only has lower von Mises stress concentration but also better needle centering due to increased contact points.

Referring to FIGS. 9A-9E, a fourth embodiment of a duckbill septum 310 is formed in two parts for ease of manufacture. The first portion 312 in this fourth embodiment is generally similar to the first portion 12 in the first, second, and third embodiments 10, 110, 210, but includes a shortened upper portion above the flange 328. Like the other designs, this first portion 312 has axial symmetry and is generally cylindrical in shape, having a top end 314, a bottom end 316, a side 318 extending between the top end 314 and the bottom end 316, and a first diameter 320, and an axis 322 extending substantially perpendicular to the first diameter 320 between the top end 314 and the bottom end 316. A central bore 324 extends along the axis 322. In some embodiments, the central bore 324 includes at least one constriction 326, also referred to as a "wiper" along the length of the bore 324. These constrictions 326 serve as seals when a needle is inserted through the bore 324 and mechanically prevent dust from passing through the bore 324, wiping the dust from the needle as it sequentially passes each constriction 326. The first portion 312 further includes a flange 328 extending from the side 318, the flange 328 having a second diameter 330 greater than the first diameter 320.

The second portion 332 of the duckbill septum 310 has bilateral symmetry and is generally cylindrical in shape, having a top end 334, a bottom end 336, a side 338 extending between the top end 334 and the bottom end 336. An upper portion 342 of the second portion 332 has a first diameter 344 and a lower portion 346 of the second portion 332 has a second diameter 348, the first diameter 344 being greater than the second diameter 348. In some embodiments, the second diameter 348 is approximately 10.35 mm, which results in an interference fit of approximately 0.145 mm when inserted into a standard sized GC injection port. In some embodiments, the first diameter 344 of the upper portion 342 is approximately 11.72 mm. In certain embodiments, the upper portion 342 has a height of approximately 1.75 mm and the lower portion 346 has a height of approximately 2.9 mm. In other embodiments, the interference fit between the septum 310 and GC injection port may be enacted by other means, such as an internal jacket, a radial force created by vertical compression of the septum 310 in the GC injection port, or other means or mechanism known in the art.

The axis extends through the second portion 332 substantially perpendicular to the first diameter 344 and second diameter 348. The top end 334 of the second portion 332 includes a recess 350 sized and shaped to receive the flange 328 and bottom end 316 of the first portion 312. A friction fit between the flange 328 and the recess 350 maintains the first portion 312 partially within the second portion 332. In other embodiments, the first portion 312 and second portion 332 may engage via an adhesive, chemical bonding, or other means known in the art. When engaged, the first portion 312 and second portion 332 are collectively referred to as the body of the septum.

The bottom end 336 of the second portion 332 includes a cavity 364 defined by the generally cylindrical lower portion 346. A duckbill valve assembly 340 is located within the cavity 364. As shown in FIGS. 9C, 9D, and 9E, the duckbill valve assembly 340 is recessed approximately 0.55 mm from the bottom end 336 to avoid contact between the duckbill valve assembly 340 and the GC inlet. The duckbill valve assembly 340 includes a slit 352, such that a needle may extend into the top end 314 of the first portion 312, through the central bore 324, out the bottom end 316 of the first portion 312, into the recess 350, and through the duckbill valve assembly 340, emerging from the slit 352.

A plurality of ribs 366 extend from the duckbill valve assembly 340 to the interior wall 368 of the cavity 364. In the depicted embodiment, two ribs 366 extend from each side 354 of the duckbill valve assembly 340, each being spaced apart on either side of the axis 322.

When in use, at least the lower portion 346 of the septum 310 is positioned within a GC injection port cavity. A predetermined interference fit between the septum 310 and injection port cavity generates compression force, which is transferred from the side 338, through the ribs 366, to opposite sides 354 of the duckbill valve assembly 340. As noted in connection with the third embodiment septum 210, a pressure on the internal sealing surface 370 of the duckbill valve assembly 340 of greater than about 0.5 MPa provides an adequate seal, but a pressure of greater than about 2.5 MPa tends to increase the abrasion of the duckbill valve assembly 340 upon repeated injection. In other embodiments, using harder or softer elastomeric material in the septum 310, higher or lower pressures may suffice to provide an adequate seal or may cause increased abrasion. Modification of the geometry of the ribs 366 can also be modified to enhance sealing at low pressures or minimize abrasion during needle insertion and retraction, particularly at higher pressures.

Figure 9A:
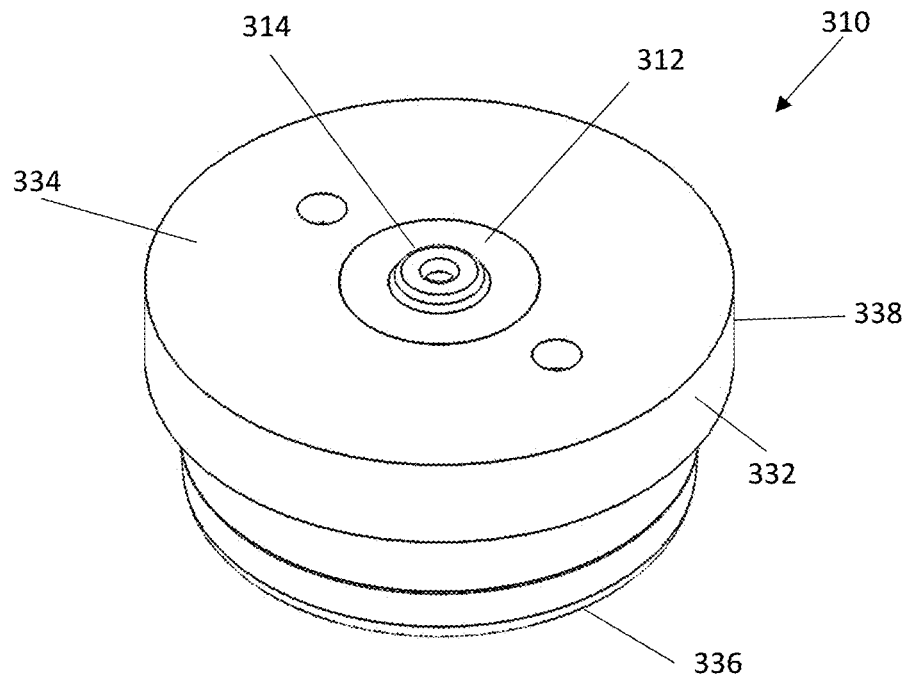
FIG. 9A depicts a top perspective view of a fourth embodiment of a duckbill septum.
Figure 9B:
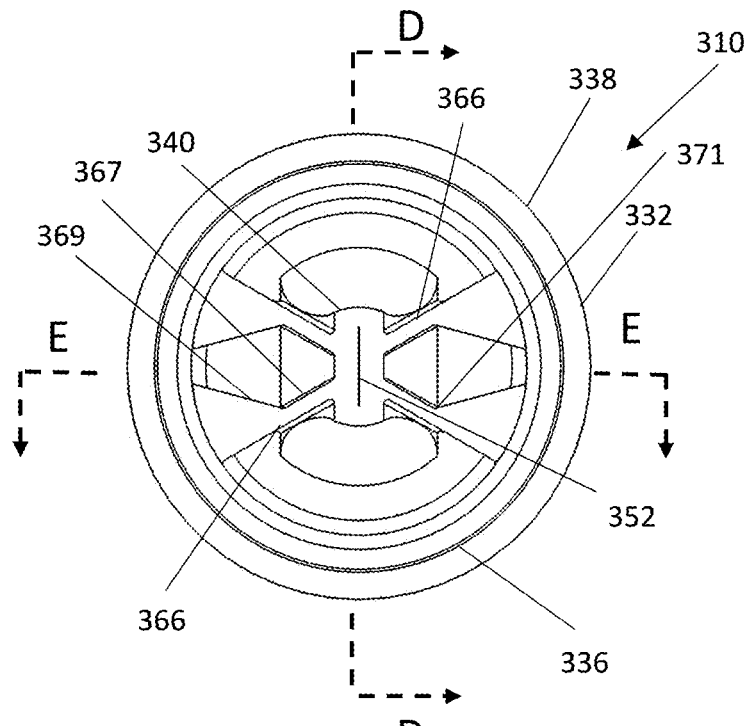
FIG. 9B depicts a bottom view of the septum of FIG. 9A.
Figure 9C:
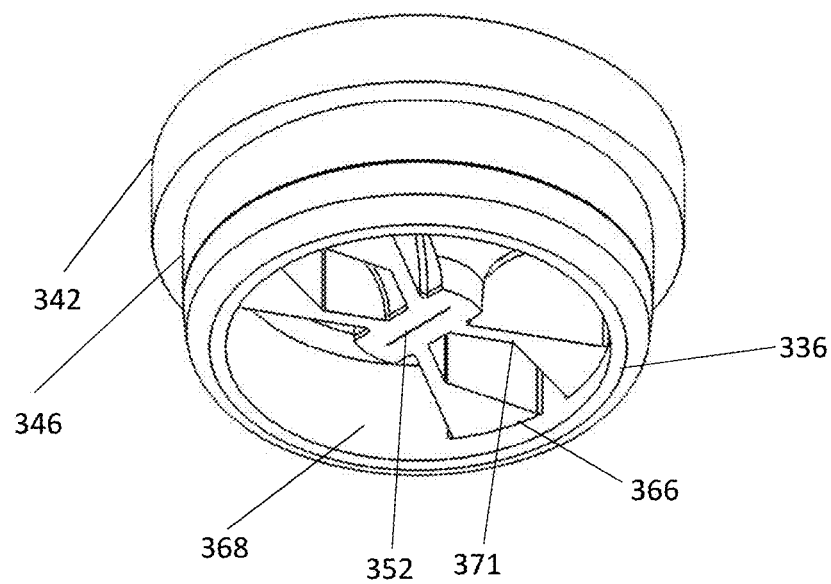
FIG. 9C depicts a bottom perspective view of the septum of FIG. 9A.
Figure 9D:
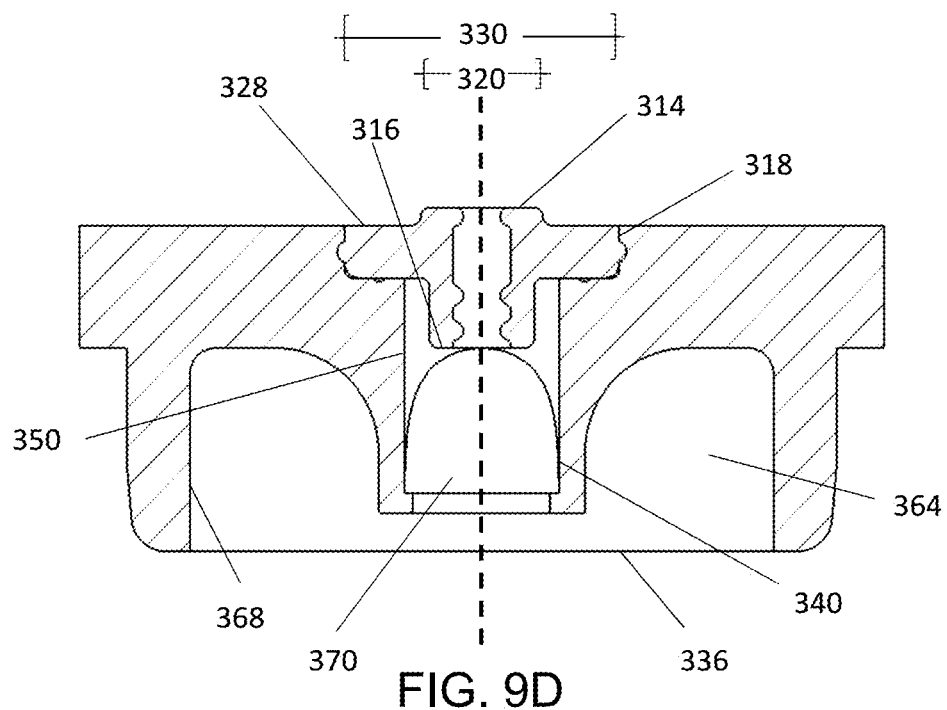
FIG. 9D depicts a cross-sectional view of the septum along line D-D of FIG. 9C
Figure 9E:
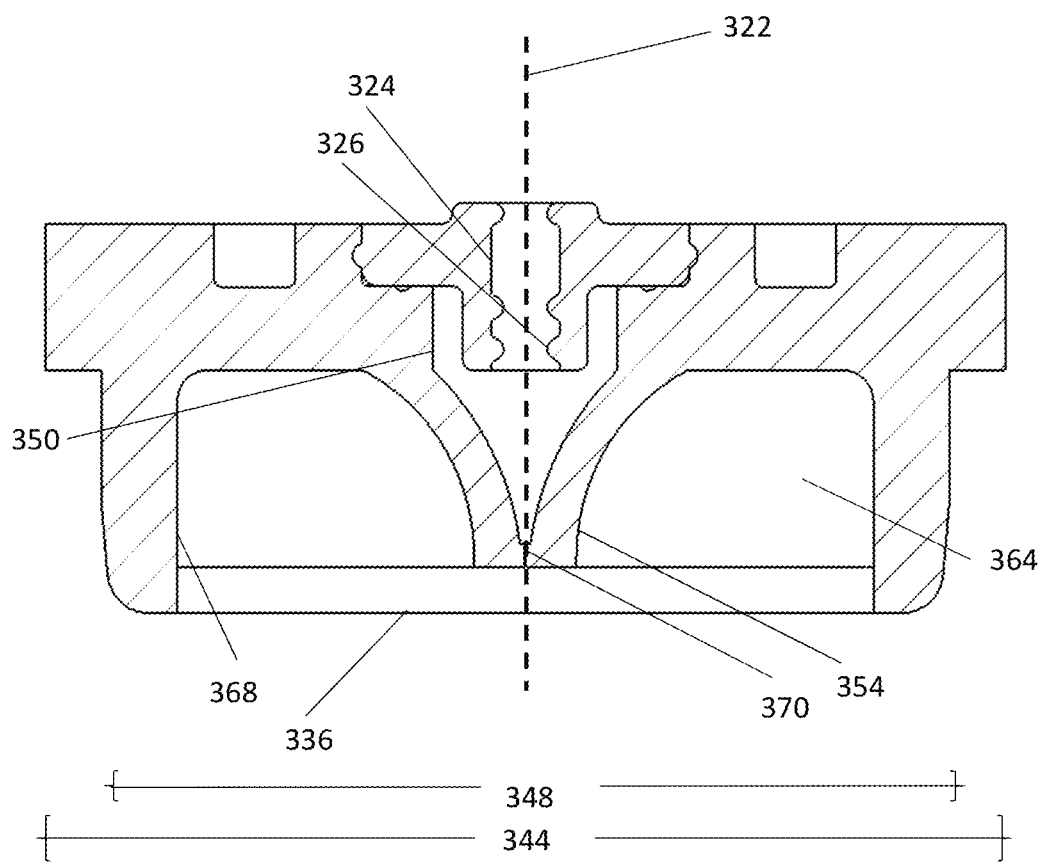
FIG. 9E depicts a cross-sectional view of the septum along line E-E of FIG. 9C.

As most easily seen in FIGS. 9B and 9C, the geometry of the ribs 366 enable the duckbill valve assembly 340 to utilize multiple modes of relaxation during translocation of the needle, specifically, compression, bending, and stretching, as described above in connection with the third embodiment septum 310. Compression along the axis of each rib occurs when the needle is inserted thereby relieving some stress that would otherwise lead to undesirable abrasion. Each rib 366 includes a relatively thin portion 367 affixed to the duckbill valve assembly 340 and a relatively thick portion 369 affixed to the interior wall 368, the thin portion 367 and thick portion 369 being arranged at a non-parallel angle, thereby forming a geometric hinge point 371 along the length of the rib 366. In some embodiments, the thin portion 367 has a width of about 0.375 mm and the thick portion 369 has a width increasing from about 0.375 mm at its contact with the thin portion 367 to about 2.11 mm at its contact with the interior wall 368. Upon insertion of a needle through the duckbill valve assembly 340, the thin portion 367 may deflect such that the rib bends around the hinge point 371. Together, these features allow the rib 366 to deflect thereby accommodating the needle as it is inserted through the duckbill valve assembly 340. Lastly, a stretching relaxation is accessible along each side 354 of the duckbill valve assembly 340 because the material can deflect in a direction perpendicular to the slit 352 into space available between the ribs 366 to accommodate the circumference of the needle. For this reason, the septum 310 includes two ribs 366 spaced apart on either side 354 of the duckbill valve assembly 340. In other embodiments, the septum 310 may include additional or fewer ribs on each side 354, or may utilize curved ribs capable of bending.

The elastomer ribs 366 can also decrease the effects of abrasion at the higher operating pressure because the ribs reduce the effective duckbill surface area exposed to pressure inside the GC inlet. The range at which the effects of reduced abrasion are noticeable are between about 3 psi to about 100 psi operating pressure. Furthermore, the angle of the ribs 366 to the needle allows for additional area of contact between the sealing surfaces 370 and the needle, thus reducing the compressive force concentration from two points to four points. The reduction of the compressive forces on the duckbill valve assembly 340 at higher pressures thereby leads to reduced abrasion on the sealing surfaces 370. Also, the angle of the ribs 366 to the needle provides additional centering since the needle is supported by four points instead of only two as in previous designs. In the depicted embodiment, the thin portion 367 of each rib 366 is oriented at an angle of approximately 60 degrees with respect to the slit 352. In other embodiments, the angle may be non-perpendicular to the slit (i.e., not 90 degrees), between 5 degrees and 85 degrees, or between 30 degrees and 75 degrees, depending on the desired characteristics of the septum 310. For example, higher degree angles may more effectively transfer compression force to the duckbill valve assembly and be more suited for use in septa intended for GC with lower operating pressure, and lower degree angles may be more suited for use in septa intended for GC with higher operating pressure.

Figure 10:
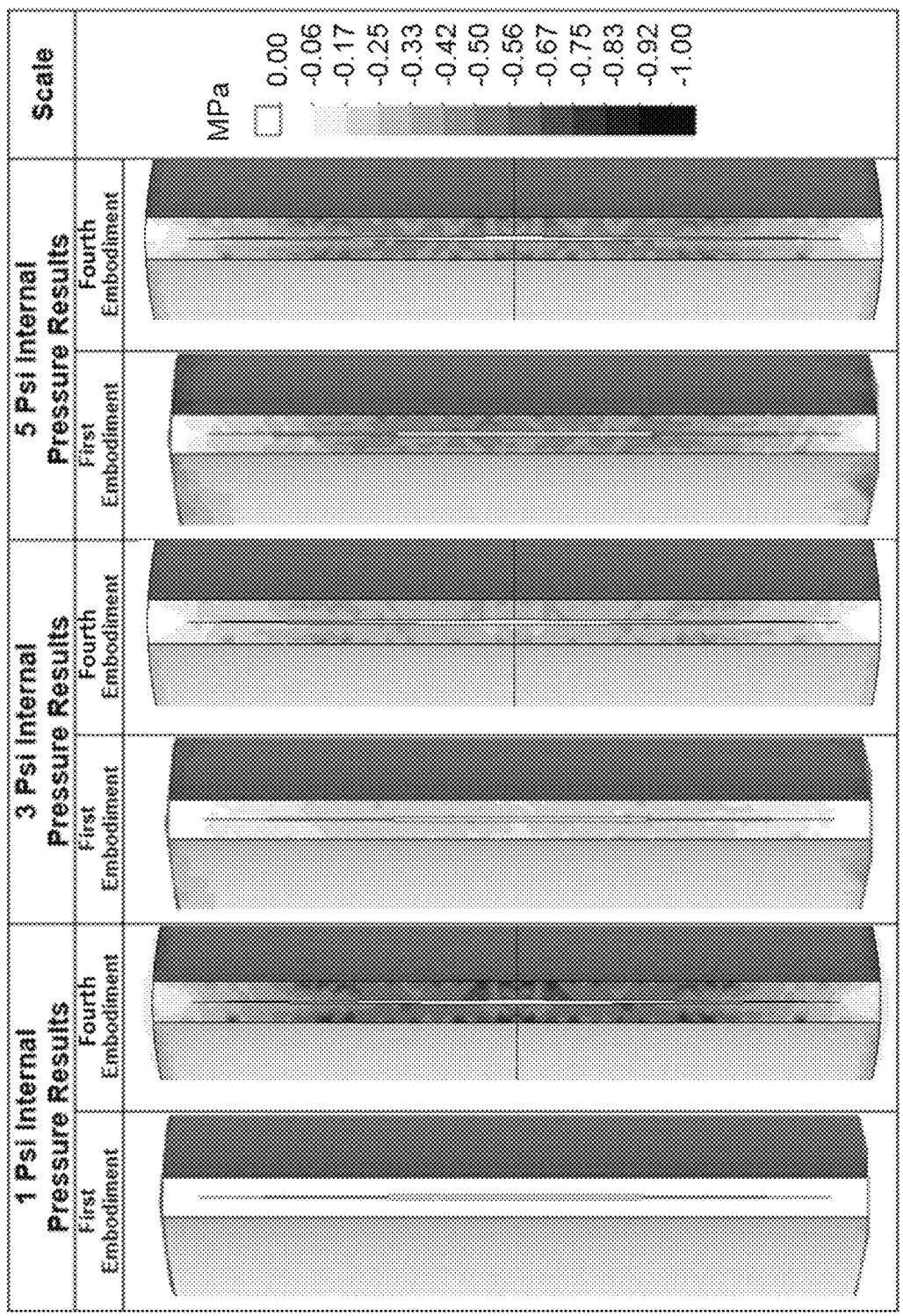
FIG. 10 is a plot of compressive stress (N/mm$^2$ or MPa) experienced by the first embodiment septum and fourth embodiment septum in pressure environments of 1 psi, 3 psi, and 5 psi.

Experimental evidence has shown that the fourth embodiment of the duckbill septum exhibits improved performance in closure of the duckbill valve assembly over the first embodiment (which lacks a spring or ribs to facilitate closure). Referring now to FIG. 10, finite element analysis was used to verify the effectiveness of the interference fit concept for sealing at low pressures. The analysis shows a top view of the duckbill sealing lips depicting compressive stress in the direction of the sealing surface comparing the first embodiment and the fourth embodiment of the duckbill septum. Without being bound by theory, it is postulated that the higher the compressive stress acting on the sealing surface, the better the sealing performance should be at low operating pressures. In these results, white indicates substantially no compressive stress and darker colors indicate higher amounts of compressive stress. Results show that the fourth embodiment duckbill septum offers compressive stress of the duckbill lips at 1 psi that is greater than the compressive stress achieved for the first embodiment duckbill septum 10 at 5 psi.

Figure 11:
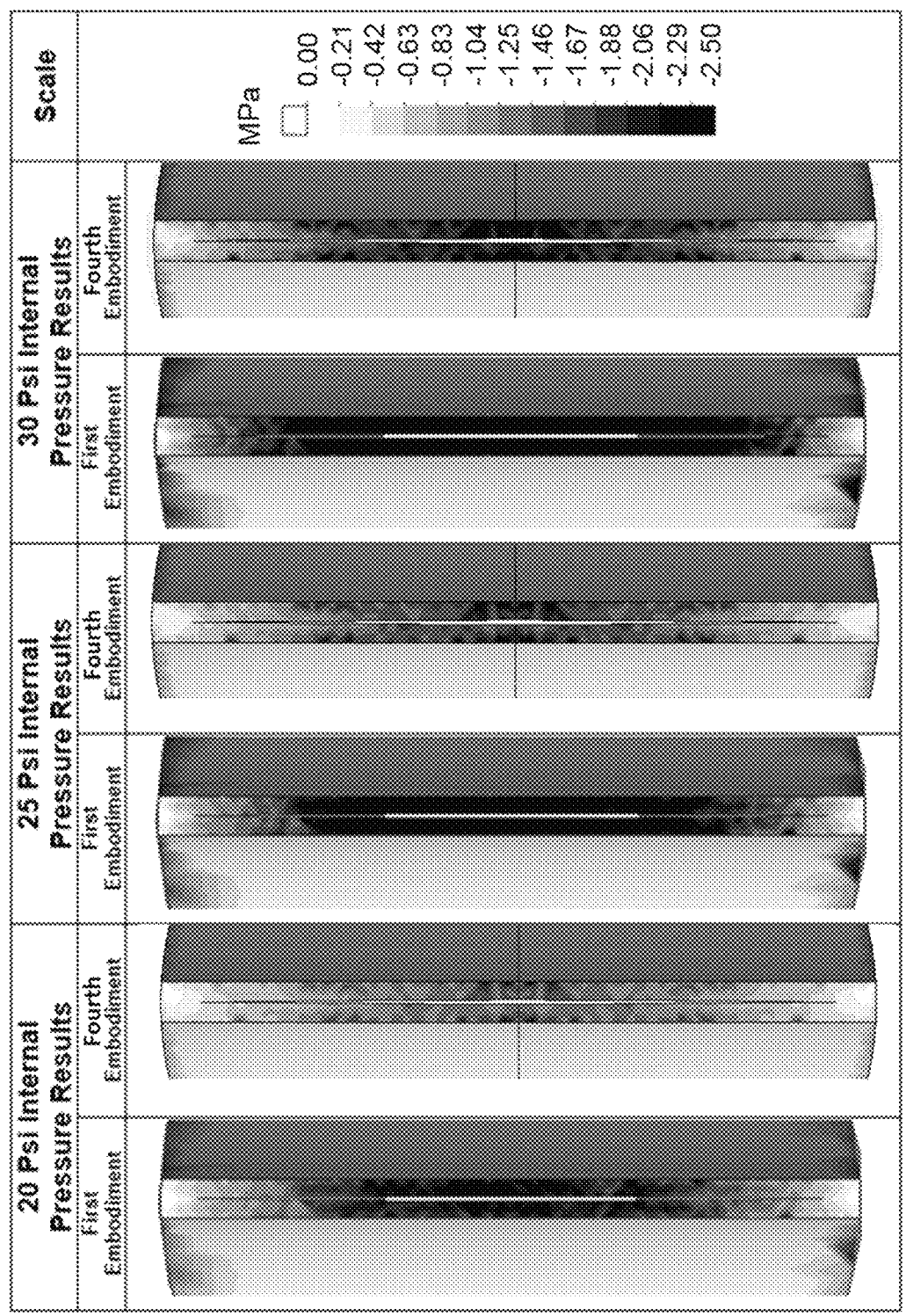
FIG. 11 is a plot of compressive force (N/mm$^2$ or MPa) experienced by the first embodiment septum and fourth embodiment septum in pressure environments of 20 psi, 25 psi, and 30 psi.

Referring now to FIG. 11, finite element analysis shows the reduction of compressive stress in the direction of the sealing surface for the fourth embodiment of the duckbill septum as compared to the first embodiment. The analysis shows a top view of the duckbill sealing lips depicting compressive stress in the direction of the sealing surface comparing the first embodiment and the fourth embodiment of the duckbill septum. In these results, white indicates substantially no compressive stress and darker colors indicate higher amounts of compressive stress. Results show that the fourth embodiment of the duckbill septum is calculated to offer similar compressive stress at 30 psi to the first embodiment of the duckbill septum at 20 psi. At these higher pressures, a lower compressive stress is preferable to reduce abrasion.

Figure 12:
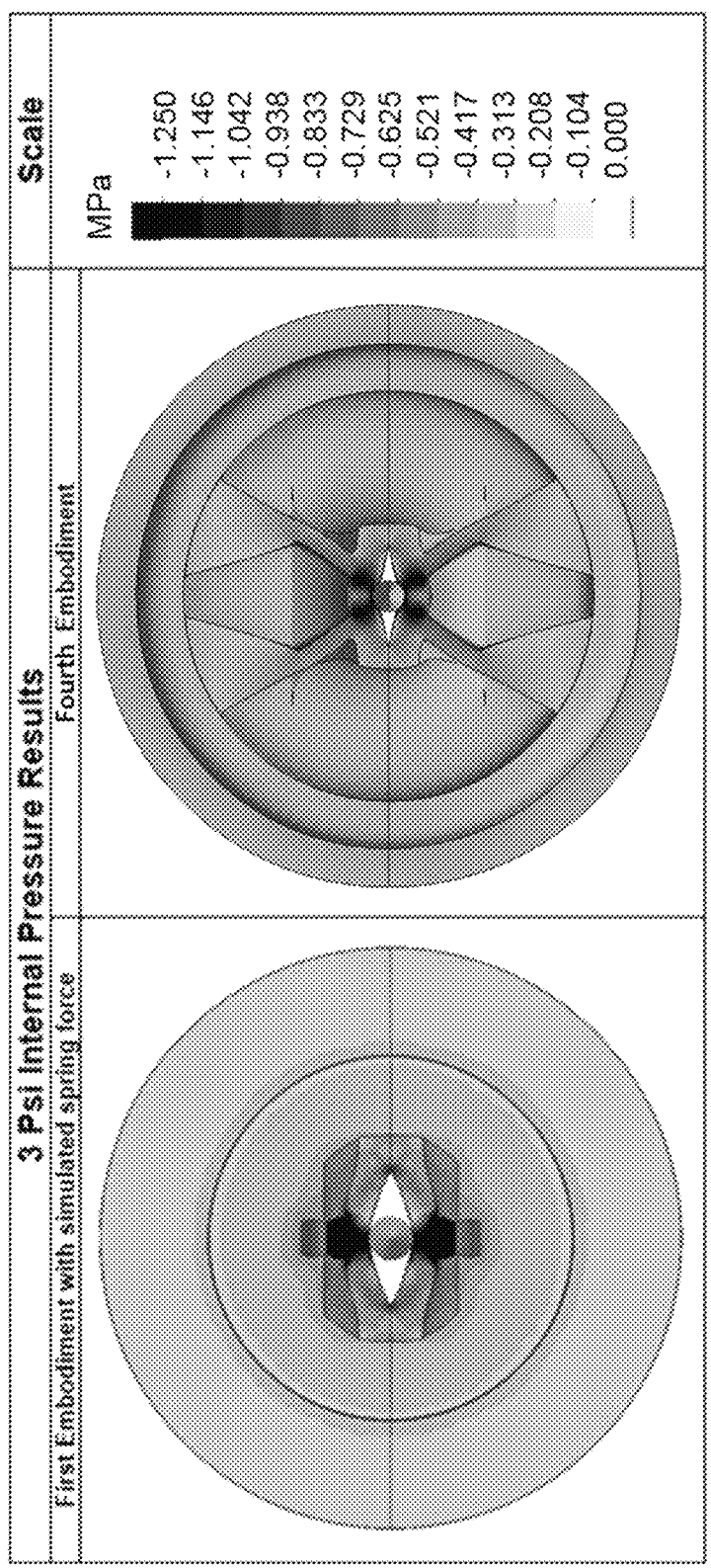
FIG. 12 is a plot of von Mises stress experienced by the first embodiment septum with simulated spring force (simulating the second embodiment duckbill septum) (left panel) and fourth embodiment septum (right panel) upon needle insertion.

Finite element analysis shows the reduction of von Mises stress for the first embodiment duckbill septum with an assumed spring force of 0.15 N applied (simulating the effect of a spring, as in the second embodiment duckbill septum), as compared to the fourth embodiment duckbill septum, with a needle inserted into each septum. FIG. 12 shows a bottom view of the respective septa depicting von Mises stress. In these results, white indicates substantially no von Mises stress and darker colors indicate higher amounts of von Mises stress. As indicated, the fourth embodiment duckbill septum not only has lower von Mises stress concentration but also better needle centering due to increased contact points.

As would be apparent to one skilled in the art after reviewing this disclosure, modifications to rib thickness, rib geometry, or interference fit will allow the duckbill valve assembly 240, 340 to accept various gauge blunt/bullet nose needle types as well as adjust desired performance characteristics such as the operable pressure range and abrasion rate (by adjusting the closing force). The third and fourth embodiments of septa 210, 310 disclosed herein are shaped and sized to fit two common types of GC inlets. It should be understood that further embodiments or modifications of the disclosed embodiments may be used to fit GC inlets of other dimensions. Furthermore, testing has revealed that a ratio of area of rib engagement in the range of 1.0625 to 3.50 provides a preferred level of performance in the third and fourth embodiments of septa 210, 310. The ratio of area of rib engagement is defined as the surface area of a rib 266, 366 engaging the interior wall 268, 368 of the cavity 264, 364 divided by the surface area of a rib 266, 366 engaging the duckbill valve assembly 240, 340.

Various aspects of different embodiments of the present disclosure are expressed in paragraphs X1, X2, and X3 as follows:

X1. One embodiment of the present disclosure includes a septum including a body formed of resilient, elastomeric material, the body including a central axis, a cavity in the body, the cavity including an interior wall, a duckbill valve assembly in the cavity, and a plurality of ribs extending from the duckbill valve assembly to the interior wall.

X2. Another embodiment of the present disclosure includes a method of using a gas chromatography septum, the method including providing a septum having a body formed of resilient, elastomeric material, the body having a top end, a bottom end, and at least one side extending between the top end and the bottom end, a cavity in the bottom end, the cavity including an interior wall, a duckbill valve assembly in the cavity, the duckbill valve assembly including a slit, and a plurality of ribs extending from the duckbill valve assembly to the interior wall, wherein each of the plurality of ribs extends from the duckbill valve assembly at a non-perpendicular angle with respect to the slit, and inserting the bottom end into a GC injection port, wherein an interference fit between the GC injection port and the body applies compressive force to the side, the compressive force being transferred through the ribs to the duckbill valve assembly.

X3. A further embodiment of the present disclosure includes a method of using a gas chromatography septum, the method including providing a septum having a body formed of elastomeric material, the body having a top end, a bottom end, and at least one side extending between the top end and the bottom end, a cavity in the bottom end, the cavity including an interior wall, a duckbill valve assembly in the cavity, and a plurality of ribs extending from the duckbill valve assembly to the interior wall, wherein each of the plurality of ribs extends from the duckbill valve assembly includes a hinge point, and inserting the bottom end into a GC injection port, wherein an interference fit between the GC injection port and the body applies compressive force to the side, the compressive force being transferred through the ribs to the duckbill valve assembly.

Yet other embodiments include the features described in any of the previous paragraphs X1, X2, or X3, as combined with one of more of the following aspects:

Wherein the duckbill valve assembly is recessed from the bottom end in the cavity.

Wherein the body includes a first portion having a top end, a bottom end, a side extending between the top end and the bottom end, and a flange extending from the side; and a second portion having a top end, a bottom end, a side extending between the top end and the bottom end, and a recess in the top end, the recess sized and shaped to receive the flange and the bottom end of the first portion.

Wherein the cavity is in the bottom end of the second portion.

Wherein the duckbill valve assembly is recessed within the cavity from the bottom end of the second portion.

Wherein the first portion includes a central bore extending along the central axis.

Wherein the central bore includes at least one constriction.

Wherein the duckbill valve assembly includes a slit, and wherein the septum is configured such that a needle may be inserted sequentially into the top end of the first portion, through the central bore, the bottom end of the first portion, the recess, and the duckbill valve assembly, emerging from the slit.

Wherein the duckbill valve assembly includes a slit, and wherein the septum is configured such that a needle may be inserted along the central axis sequentially into the top end of the first portion, through the central bore, the bottom end of the first portion, the recess, and the duckbill valve assembly, emerging from the slit.

Wherein the second portion is generally cylindrical in shape and includes an upper portion having a first diameter and a lower portion having a second diameter, the first diameter being greater than the second diameter, and wherein the second diameter is sized to fit at least partially within a gas chromatography injection port.

Wherein each of the plurality of ribs includes a hinge point.

Wherein each of the plurality of ribs includes a thin portion attached to the duckbill valve assembly and a thick portion attached to the interior wall.

Wherein each of the plurality of ribs has a ratio of area of rib engagement in the range of 1.0625 to 3.50.

Wherein the duckbill valve assembly includes a pair of opposing sides and a slit, and wherein at least one rib extends from each side of the duckbill valve assembly at a non-perpendicular angle with respect to the slit.

Wherein the angle is between 5 degrees and 85 degrees.

Wherein the angle is between 30 degrees and 75 degrees.

Wherein at least two ribs extend from each side of the duckbill valve assembly, the ribs spaced apart from each other.

Further comprising inserting a needle into the top end of the septum and through the duckbill valve assembly, the needle emerging from the slit, wherein each of the plurality of ribs bends about a hinge point in each rib during said inserting.

Further comprising inserting a needle into the top end of the septum and through the duckbill valve assembly, wherein each of the plurality of ribs bends about the hinge point in each rib during said inserting.

The foregoing detailed description is given primarily for clearness of understanding and no unnecessary limitations are to be understood therefrom, for modifications can be made by those skilled in the art upon reading this disclosure and may be made without departing from the spirit of the invention. Although specific spatial dimensions are stated herein, such specific quantities are presented as examples only. Reference systems, if used herein, refer generally to various directions (for example, top, bottom, upper, lower, forward, rearward, left, right, etc.), which are merely offered to assist the reader in understanding the various embodiments of the disclosure and are not to be interpreted as limiting. Other reference systems may be used to describe various embodiments.

What is claimed is:

1. A septum comprising:
   a body formed of resilient, elastomeric material, the body including a central axis;
   a cavity in the body, the cavity including an interior wall;
   a duckbill valve assembly in the cavity; and
   a plurality of ribs extending from the duckbill valve assembly to the interior wall, wherein each of the plurality of ribs includes a thin portion attached to the duckbill valve assembly and a thick portion attached to the interior wall, the thin portion and the thick portion being arranged at a non-parallel angle, forming a hinge point.

2. The septum of claim 1, wherein the body includes
   a first portion having a top end, a bottom end, a side extending between the top end and the bottom end, and a flange extending from the side; and
   a second portion having a top end, a bottom end, a side extending between the top end and the bottom end, and a recess in the top end, the recess sized and shaped to receive the flange and the bottom end of the first portion.

3. The septum of claim 2, wherein the duckbill valve assembly is recessed from the bottom end of the first portion in the cavity.

4. The septum of claim 2, wherein the cavity is in the bottom end of the second portion.

5. The septum of claim 4, wherein the duckbill valve assembly is recessed within the cavity from the bottom end of the second portion.

6. The septum of claim 2, wherein the first portion includes a central bore extending along the central axis.

7. The septum of claim 6, wherein the central bore includes at least one constriction.

8. The septum of claim 6, wherein the duckbill valve assembly includes a slit; and wherein the septum is configured such that a needle may be inserted sequentially into the top end of the first portion, through the central bore, the bottom end of the first portion, the recess, and the duckbill valve assembly, emerging from the slit.

9. The septum of claim 2, wherein the second portion is generally cylindrical in shape and includes an upper portion having a first diameter and a lower portion having a second diameter, the first diameter being greater than the second diameter; and
   wherein the second diameter is sized to fit at least partially within a gas chromatography injection port.

10. The septum of claim 1, wherein the duckbill valve assembly includes a pair of opposing sides and a slit, and wherein at least one rib extends from each side of the duckbill valve assembly at a non-perpendicular angle with respect to the slit.

11. The septum of claim 10, wherein the angle is between 5 degrees and 85 degrees.

12. The septum of claim 10, wherein at least two ribs extend from each side of the duckbill valve assembly, the ribs spaced apart from each other.

13. The septum of claim 1, wherein each of the plurality of ribs has a ratio of area of rib engagement in the range of 1.0625 to 3.50.

14. A method of using a gas chromatography septum, comprising:
    providing a septum having a body formed of resilient, elastomeric material, the body having a top end, a bottom end, and at least one side extending between the top end and the bottom end,
    a cavity in the bottom end, the cavity including an interior wall,
    a duckbill valve assembly in the cavity, the duckbill valve assembly including a slit, and
    a plurality of ribs extending from the duckbill valve assembly to the interior wall, wherein each of the plurality of ribs extends from the duckbill valve assembly at a non-perpendicular angle with respect to the slit, wherein each of the plurality of ribs includes a thin portion attached to the duckbill valve assembly and a thick portion attached to the interior wall, the thin portion and the thick portion being arranged at a non-parallel angle, forming a hinge point; and
    inserting the bottom end into a GC injection port;
    wherein an interference fit between the GC injection port and the body applies compressive force to the side, the compressive force being transferred through the ribs to the duckbill valve assembly.

15. The method of claim 14, further comprising inserting a needle into the top end of the septum and through the duckbill valve assembly, the needle emerging from the slit, wherein each of the plurality of ribs bends about the hinge point in each rib during said inserting.

16. The method of claim 14, wherein the angle is between 5 degrees and 85 degrees.

17. The septum of claim 14, wherein the compressive force is between 0.5 MPa and 2.5 MPa.

18. A method of using a gas chromatography septum, comprising:
    providing a septum having a body formed of elastomeric material, the body having a top end, a bottom end, and at least one side extending between the top end and the bottom end,
    a cavity in the bottom end, the cavity including an interior wall,
    a duckbill valve assembly in the cavity, and
    a plurality of ribs extending from the duckbill valve assembly to the interior wall, wherein each of the plurality of ribs includes a thin portion attached to the duckbill valve assembly and a thick portion attached to the interior wall, the thin portion and the thick portion being arranged at a non-parallel angle, wherein each of the plurality of ribs includes a hinge point at the intersection of the thin portion and the thick portion; and
    inserting the bottom end into a GC injection port;
    wherein an interference fit between the GC injection port and the body applies compressive force to the side, the compressive force being transferred through the ribs to the duckbill valve assembly.

19. The method of claim 18, further comprising inserting a needle into the top end of the septum and through the duckbill valve assembly, wherein each of the plurality of ribs bends about the hinge point in each rib during said inserting.

20. The septum of claim 18, wherein the compressive force is between 0.5 MPa and 2.5 MPa.

* * * * *